(12) United States Patent
Kondou et al.

(10) Patent No.: US 6,663,814 B2
(45) Date of Patent: Dec. 16, 2003

(54) PROCESS FOR PRODUCING ADSORBENT AND CLEANING FILTER

(75) Inventors: Syouko Kondou, Tokyo (JP); Kazuhisa Murase, Tokyo (JP); Akira Kamei, Tokyo (JP); Masao Andou, Tokyo (JP)

(73) Assignee: Kabushikikaisha Equos Research Co., Ltd. (JP)

( * ) Notice: Subject to any disclaimer, the term of this patent is extended or adjusted under 35 U.S.C. 154(b) by 0 days.

(21) Appl. No.: 09/959,248

(22) PCT Filed: Feb. 26, 2001

(86) PCT No.: PCT/JP01/01434

§ 371 (c)(1),
(2), (4) Date: Jan. 14, 2002

(87) PCT Pub. No.: WO01/64350

PCT Pub. Date: Sep. 7, 2001

(65) Prior Publication Data

US 2003/0042197 A1 Mar. 6, 2003

(30) Foreign Application Priority Data

Feb. 29, 2000 (JP) .......................................... 2000-053172
Feb. 14, 2001 (JP) .......................................... 2001-036426

(51) Int. Cl.[7] ........................... B29B 11/14; B29C 35/00
(52) U.S. Cl. ........................................ 264/239; 264/109
(58) Field of Search ................................. 264/109–128, 264/239–339

(56) References Cited

U.S. PATENT DOCUMENTS

| 4,201,234 A | * 5/1980 | Neukomm ................... 131/342 |
| 5,914,294 A | 6/1999 | Park et al. |

FOREIGN PATENT DOCUMENTS

| JP | 49-32941 | 5/1974 |
| JP | 08-155294 | 12/1994 |
| JP | 09-173828 | 11/1996 |
| JP | 10-265273 | 3/1997 |
| JP | 11-035381 | 7/1997 |
| JP | 11-147707 | 11/1997 |
| JP | 2000-176278 | 12/1998 |

* cited by examiner

Primary Examiner—Stephen J. Lechert, Jr.
(74) Attorney, Agent, or Firm—Lorusso, Loud & Kelly

(57) ABSTRACT

An adsorbent block that has a high adsorption efficiency and can be produced at a low cost is provided. A paste comprising water having mainly active carbon powder dispersed therein is prepared, and a molded block is formed with the paste. Water is removed from the molded block to bind mainly the active carbon powder, so as to obtain an adsorbent block formed to have cells. The paste contains an agar component that is capable of shrinking the molded block and of increasing the surface area of the cell by disappearance.

5 Claims, 22 Drawing Sheets

PROCESS FOR PRODUCING ADSORBENT AND CLEANING FILTER

This application claims benefit under 35 U.S.C. 371 of PCT/JP01/01434 filed Feb. 26, 2001.

TECHNICAL FIELD

The present invention relates to a process for producing an adsorbent block and a cleaning filter. The adsorbent block obtained by the process is preferably used in the cases where an offensive odor and harmful components are removed from a gas, such as air, and impurity ions are removed from a liquid, such as water. Therefore, the adsorbent block can be used as a cleaning filter in an air cleaning apparatus, such as an air cleaner, an air conditioner, in an water cleaning apparatus or the like, used in automobiles, home and factories.

BACKGROUND ART

For example, an air cleaner and the like are required to remove an offensive odor and the like from the air. Therefore, an adsorbent block removing an offensive odor and the like from the air is preferably used in a cleaning filter used therefor. As the adsorbent block, one having a honeycomb form formed by binding active carbon powder to have cells is known (Japanese Patent Laid-Open No. 5-242).

The conventional adsorbent block is produced roughly in the following manner. That is, a paste is prepared as a dispersion system having active carbon powder as a solid disperse phase in water as a liquid dispersion medium and containing a binder capable of dispersing various kinds of active carbon powder, and the paste is extruded to mold into a molded block in a honeycomb form. Water is then removed from the molded block to obtain an adsorbent block in a honeycomb form mainly comprising active carbon powder thus bound.

The resulting adsorbent block has continuous flow paths extending in a straight form as cells ascribed to the honeycomb form. Therefore, when the adsorbent block is used as a cleaning filter, for example, in an air cleaner, the air flows in the continuous flow paths, during which an offensive odor component and the like for having high adsorption efficiency in the resulting adsorbent in the air are adsorbed in minute pores to be removed.

DISCLOSURE OF THE INVENTION

However, in order to increase the contact area with an offensive odor component and the like in the foregoing conventional production process, the number of the continuous flow paths per unit area or unit volume is necessarily increased. In this case, when an adsorbent block in a honeycomb form is to be obtained, the number of the continuous flow paths per unit area or unit volume of the molded block of a honeycomb form itself is necessarily increased, and the production of an extruding die becomes difficult, so as to cause increase of the production cost.

This invention is made in view of the foregoing conventional circumstances, and has a problem to be solved to provide an adsorbent block having a high adsorption efficiency and can be produced at a low cost.

The first invention is a process for producing an adsorbent block comprising a first step of preparing a dispersion system comprising a liquid dispersion medium mainly having porous material powder as a solid disperse phase, and forming a molded block from said dispersion system, and a second step of removing said liquid dispersion medium from said molded block to bind mainly said porous material powder, so as to obtain an adsorbent block formed to have continuous flow paths, characterized in that said dispersion system contains a shrinkage agent that is capable of shrinking said molded block in said second step, and said shrinkage agent is capable of being swelled in a state of said dispersion system.

According to the test result of the inventors, in the case where a water absorbing resin or an agar component that are commercially available is employed as the shrinkage agent, and water is employed as the liquid dispersion medium, the water absorbing resin or the agar component is swelled with the liquid dispersion medium in the dispersion system. Accordingly, when the shrinkage agent is capable of being swelled in the state of the dispersion system, the molded block formed with the dispersion system is shrinked by removing the liquid dispersion medium in the second step. Therefore, according to the production process of the first invention, in the case where an adsorbent block in a honeycomb form is to be obtained, the molded block is shrinked in the second step even though the number of the continuous flow paths per unit area or unit volume of the molded block of a honeycomb form itself is not so increased, and the resulting adsorbent block has a number of the continuous flow paths per unit area or unit volume that is larger than the molded block.

Therefore, according to the production process of the first invention, the resulting adsorbent block has a large contact area with an offensive odor component and the like to have a high adsorbing efficiency. According to the production process of the first invention, since the mesh of a die for obtaining the molded block is not necessarily be fine, the production of the molded block is not difficult, and reduction of the production cost is realized.

Furthermore, when the shrinkage agent is contained in the dispersion system, the shrinkage of the molded block uniformly proceeds, and the dimensional stability of the molded block can be easily maintained.

According to a test result of the inventors, in the production process of the first invention, it is preferred that the shrinkage agent is employed in such a manner that the molded block is shrinked to a linear shrinkage ratio of from 5 to 25% per a molded block containing no shrinkage agent. The shrinkage agent that shrinks the molded block only to less than 5% per a molded block containing no shrinkage agent can exhibit substantially no effect of the invention. On the other hand, in the case of the shrinkage agent that shrinks the molded block to 25% or more per a molded block containing no shrinkage agent, molding becomes difficult, and the dimensional stability of the adsorbent block is difficult to be maintained due to distortion on shrinkage. A shrinkage agent capable of shrinking the molded block to from 7 to 20% per a molded block containing no shrinkage agent is preferred.

In the production process of the first invention, a high water absorbing resin having a large water holding ratio can be used as the shrinkage agent. As the high water absorbing resin, an acrylic series water absorbing resin, such as a starch-acrylic acid graft polymer, a crosslinked polyacrylate, a saponified product of a vinyl acetate-acrylate copolymer and the like, can be used. More specifically, a high water absorbing resin that can absorb water in a mass of from 100 to 1,000 times per unit mass is preferred. A high water absorbing resin that can absorb water in a mass of from 200 to 800 times per unit mass is more preferred, and a high water absorbing resin that can absorb water in a mass of from 400 to 700 times per unit mass is further preferred.

On the other hand, according to a test result of the inventors, in the case where a commercially available high water absorbing resin is employed as the shrinkage agent, and water is employed as the liquid dispersion medium, the high water absorbing resin can be swelled only in the dispersion system. It is considered that such a phenomenon occurs because high water adsorbing resin is crosslinked, even when a large amount of water is involved, the network structure of the linear molecules is stretched at all. In this case, therefore, the molded block is shrinked only at a low shrinkage ratio, and the improvement of the adsorption efficiency is limited. In order to avoid the phenomenon, it is necessary that the average particle diameter of the high water absorbing resin is decreased to solve the crosslinking of the high water absorbing resin, but the molded block is still shrinked at a low shrinkage ratio, and such a step is necessary that the high water absorbing resin is pulverized, whereby increase of the production cost occurs.

On the other hand, in the case where an agar component is employed as the shrinkage agent, and water is employed as the liquid dispersion medium, the agar component can be infinitely swelled in the dispersion system since it is easily dissolved in water. In more detail, while the extent of swelling is finite in cold water, it is infinitely swelled in warm water and hot water. Therefore, even when the number of the continuous flow paths per unit area or unit volume of the molded block itself is not so increased, the shrinkage agent shrinks the molded block to a high shrinkage ratio, and thus the resulting adsorbent block has an extremely larger number of the continuous flow paths per unit area or unit volume than the molded block.

Therefore, in the case where a shrinkage agent that can be infinitely swelled in the state of the dispersion system is employed as the shrinkage agent in the production process of the first invention, the resulting adsorbent block has an extremely large contact area with an offensive odor component and the like to exhibit an extremely high adsorption efficiency. In this case, since it is certainly not necessary to make fine the mesh of the die for obtaining the molded block, the production of the die truly involves no difficulty, and since the particle diameter of the shrinkage agent is not necessarily be considered, the reduction of the production cost is certainly realized. In other words, corresponding to the production line, the allowable cost and the like of the adsorbent block, the shrinkage ratio of the molded block, i.e., the adsorption efficiency of the adsorbent block, can be controlled as desired.

According to the analysis of the inventors, the agar component is one kind of hemicellulose contained in a cell membrane of algae. It had been considered that hemicellulose is a precursor of cellulose, but it has no relationship in structure and easily hydrolyzed with an acid or an enzyme as different from cellulose. It is considered that cellulose is added to the dispersion system to prevent cracks and strain of the molded block, but the shrinkage of the molded block is not considered in this case. The agar component comprises agarose as the main component and agaropectin as a small amount component. Agarose comprises alternating bonds of β-D-galactose and 3,6-anhydro-α-L-galactose, and is a neutral polysaccharide component having a high gelation power. In particular, the agar component having agarose as the main component is easily dissolved in warm water or hot water, and such a nature that it is gelled upon cooling. Therefore, when the shrinkage agent contains agarose, agarose effectively shrinks the molded block even when the number of the continuous flow paths per unit area or unit volume of the molded block itself is not so increased, and thus the resulting adsorbent block has an extremely larger number of continuous flow paths per unit area or unit volume than the molded block.

Therefore, in the production process of the first invention, when the shrinkage agent contains agarose, the resulting adsorbent block has an extremely large contact area with an offensive odor component and the like and thus has an extremely high adsorbing efficiency. In this case, since it is certainly not necessary to make fine the mesh of the die for obtaining the molded block, the production of the die truly involves no difficulty, and the reduction of the production cost is certainly realized. In other words, corresponding to the production line, the allowable cost and the like of the adsorbent block, the shrinkage ratio of the molded block, i.e., the adsorption efficiency of the adsorbent block, can be controlled as desired.

The dispersion medium system relating to the first step of the first invention contains the liquid dispersion medium and a solid disperse phase. The liquid dispersion medium is one that can constitute the dispersion system along with porous material powder as the solid disperse phase. The liquid dispersion medium relating to the first invention is necessarily one capable of being swelled with the shrinkage agent in the state of the dispersion system. When it is the case, the molded block is shrinked by removing the liquid dispersion medium from the molded block, so as to obtain the adsorbent block. As the liquid dispersion medium relating to the first invention, water is generally employed in the case where the shrinkage agent is an agar component. Water includes any of cold water, warm water and hot water. Depending on the selection of the shrinkage agent, a volatile solvent, such as an alcohol and the like, can be employed as the liquid dispersion medium. The agar component is dispersed in water along with the porous material powder, whereby a gelled dispersion system can be obtained. Thereafter, the dispersion system is subjected to molding, so as to mold a molded block having continuous flow paths.

The dispersion system relating to the first invention preferably contains a binder capable of binding the respective porous material powder. This is because the strength of the adsorbent block can be ensured thereby. In the case where water is employed as the liquid dispersion medium, a water soluble binder can be employed. As the water soluble binder, a cellulose derivative, such as methyl cellulose, carboxymethyl cellulose, ethyl cellulose, hydroxypropyl cellulose and the like, polyvinyl alcohol, polyvinyl butyral, polyethylene glycol and the like can be employed. In the case where an adsorbent block is used for removing impurity ions from water, a water resistant binder is used. The mixing ratio of the binder is not particularly limited, and the binder is preferably mixed at a mass ratio of from 1 to 50 parts by mass per 100 parts by mass of the mixture of the porous material powder and the shrinkage agent. It is more preferred that the binder is mixed at a mass ratio of from 2 to 30 parts by mass per 100 parts by mass of the mixture of the porous material powder and the shrinkage agent. It is further preferred that the binder is mixed at a mass ratio of from 5 to 15 parts by mass per 100 parts by mass of the mixture of the porous material powder and the shrinkage agent. The dispersion system may further contain a molding assistant, such as a dispersing agent, a wetting agent and the like.

As the second step of the first invention, in addition to air blowing and allowing to stand at room temperature, heat drying conducted at a temperature, at which combustion of the shrinkage agent and the like does not occur, freeze drying and the like can be employed.

The adsorbent block obtained by the first invention is formed to have continuous flow paths by binding mainly the porous material powder. The continuous flow path is a flow path that continues from an inlet to an outlet of the air or the like.

In the case where an adsorbent block of a honeycomb form is formed to have cells by the production process of the first invention, a cleaning filter can be obtained by the adsorbent block. The adsorbent block of the cleaning filter is produced by a production process comprising a first step of preparing a paste comprising water having mainly active carbon powder dispersed therein, and molding a molded block with the paste, and a second step of removing water from the molded block to bind mainly the active carbon powder. At this time, the paste contains a shrinkage agent that is capable of shrinking the molded block in the second step, and the shrinkage agent is capable of being swelled in a state of the paste.

The production process as a second invention comprises a first step of preparing a dispersion system comprising a liquid dispersion medium mainly having porous material powder as a solid disperse phase, and forming a molded block from the dispersion system, and a second step of removing the liquid dispersion medium from the molded block to bind mainly the porous material powder, so as to obtain an adsorbent block formed to have continuous flow paths, characterized in that the dispersion system contains a binder that is capable of binding the porous material powder and an area increasing agent that disappears by heating the molded block at a particular temperature, at which the binder does not disappear, and the second step comprises a liquid dispersion medium removing step of removing the liquid dispersion medium, and a heating step of heating the molded block at the particular temperature.

In the production process of the second invention, since the molded block is heated to the particular temperature in the heating step, the area increasing agent disappears, but the binder does not disappear. If the binder also disappears, the strength of the adsorbent block becomes deteriorated. If only the area increasing agent disappears in this manner, the pores are increased to that extent to increase the surface area of the continuous flow paths. Accordingly, such porous material powder that is present in a deep place of the wall constituting the continuous flow paths is also utilized to increase the contact area with the offensive odor component and the like, whereby an adsorbent block of an extremely high adsorption efficiency can be obtained. The disappearance of the area increasing agent may be effected by carbonization, which does not reach vaporization.

According to the production process of the second invention, in the case where an adsorbent block in a honeycomb form is to be obtained, the surface area of the continuous flow paths is increased in the area increasing step of the second step even though the number of the continuous flow paths per unit area or unit volume of the molded block of a honeycomb form itself is not so increased, and the resulting adsorbent block has a large contact area with the offensive odor and the like.

Therefore, according to the production process of the second invention, the resulting adsorbent block has a high adsorption efficiency. According to the production process of the second invention, since the mesh of a die for obtaining the molded block is not necessarily be fine, the production of the molded block is not difficult, and reduction of the production cost is realized.

As the second step of the second invention, in addition to air blowing and allowing to stand at room temperature, heat drying conducted at a temperature, at which combustion of the shrinkage agent and the like does not occur, freeze drying and the like can be also employed. It is preferred from the standpoint of efficiency that heat drying is conducted as the liquid dispersion medium removing step, and the heating step is continuously conducted.

In the case where the water soluble binder is employed, and water is employed as the liquid dispersion medium in the production process of the second invention, an agar component can be employed as the area increasing agent. The high water absorbing resin has a carbonization temperature that is substantially the same as the water soluble binder, and it is difficult that only the high water absorbing resin is made disappear, but the binder is not made disappear. From the standpoint, the agar component is carbonized and vaporized at a low temperature in comparison to the water soluble binder. This is because the agar component is obtained by extracting from seaweed naturally yielded. The water soluble binder is burnt at about 300° C., and thus heating at the particular temperature lower than that temperature can be employed as the area increasing step. In addition to this, natural organic powder and the like can be exemplified as the area increasing agent that can be employed with the water soluble binder.

The dispersion system relating to the first step of the second invention also contains the liquid dispersion medium and the solid disperse phase. The liquid dispersion medium relating to the second invention is one that can constitute the dispersion system along with porous material powder as the solid disperse phase, the area increasing agent and the binder, and can be removed from the molded block by the liquid dispersion medium removing step, so as to increase the surface area of the continuous flow paths in the area increasing step. As the liquid dispersion medium, water is generally employed in the case where the area increasing agent is an agar component. Water includes any of cold water, warm water and hot water. Depending on the selection of the area increasing agent, a volatile solvent, such as an alcohol and the like, can be employed as the liquid dispersion medium.

In the second invention, the mixing ratio of the binder is not particularly limited, and the binder is preferably mixed at a mass ratio of from 1 to 50 parts by mass per 100 parts by mass of the mixture of the porous material powder and the area increasing agent. It is more preferred that the binder is mixed at a mass ratio of from 2 to 30 parts by mass per 100 parts by mass of the mixture of the porous material powder and the area increasing agent. It is further preferred that the binder is mixed at a mass ratio of from 5 to 15 parts by mass per 100 parts by mass of the mixture of the porous material powder and the area increasing agent. The dispersion system may further contain a molding assistant, such as a dispersing agent, a wetting agent and the like.

The adsorbent block obtained by the second invention is formed to have continuous flow paths by binding mainly the porous material powder. The continuous flow path is a flow path that continues from an inlet to an outlet of the air or the like.

In the case where an adsorbent block of a honeycomb form is formed to have cells by the production process of the second invention, a cleaning filter can be obtained by the adsorbent block. The adsorbent block of the cleaning filter is produced by a production process comprising a first step of preparing a paste comprising water having mainly active carbon powder dispersed therein, and molding a molded block with the paste, and a second step of removing water from the molded block to bind mainly the active carbon powder. At this time, the paste contains a binder that is capable of binding the active carbon powder and an area increasing agent that disappears by heating the molded block at a particular temperature, at which the binder does not disappear, and the second step comprises a liquid dispersion medium removing step of removing water, and a heating step of heating the molded block at the particular temperature.

In the production process of the first and second inventions, the molded block may be molded only with the dispersion system, or in alternative, may be formed by fixing the dispersion system on a substrate material, such as metallic plate, e.g., an aluminum alloy and the like, ceramics, paper, wood and the like.

In the production process of the first and second inventions, as the porous material powder as the solid disperse phase, active carbon powder can be employed. In addition to this, silica aerosol, zeolite, bentonite and the like can be employed. By using the porous material powder, a VOC (Volatile Organic Compounds), such as formaldehyde and the like, and an offensive odor component and a harmful component, such as $NO_x$, $SO_x$ and the like contained in a gas, such as the air, and impurity ions and the like contained in a liquid, such as water, can be removed by adsorbing on minute pores of the porous material powder.

In the production process of the first and second inventions, when the molded block is obtained by extrusion molding, the disperse system is preferably has a low soft degree (i.e., becomes hard), but in the case where the shrinkage agent or the area increasing agent is an agar component, it is necessary that a large amount of water is added as the liquid dispersion medium for realizing shrinkage and pores in future, and thus the disperse system has a high soft degree (i.e., becomes soft). As a result of the test conducted by the inventors, in the case where active carbon powder is employed as the porous material powder, while depending on the particle diameter of the active carbon powder, the soft degree is preferably from 5 to 20 mm, which is the difference in the position of one end of a sample in the case where the sample having a cylindrical shape having a length of 5 cm and a diameter of 2 mm is formed, and then the center position of the sample is supported at room temperature to bend one end by gravity. When the soft degree is less than 5 mm, the dispersion system is too hard, and the molding of the molded block is not easy. On the other hand, the soft degree exceeds 20 mm, the dimensional stability of the molded block is poor. The soft degree is more preferably from 5 to 10 mm.

According to a result of the test conducted by the inventors, in the production process of the first and second inventions, less than 15 parts by mass of an agar component is preferably contained in 100 parts by mass of active carbon powder, and it is preferred that these are dispersed with from 120 to 250 parts by mass of water. When the amount of the agar component is too large with respect to the proportion of the active carbon powder, the strength of the adsorbent block is difficult to maintain due to disappearance of the agar component in the area increasing step. The proportion of water depends on the proportion of the agar component. Since the agar component is disappeared in the area increasing step, it is not necessary that the agar component is completely dissolved in the dispersion system.

In the production process of the first and second inventions, a photocatalyst, an room temperature oxidation catalyst and the like for oxidation decomposition of an VOC (Volatile Organic Compounds), such as formaldehyde, may be carried on the adsorbent block. In this case, the photocatalyst and the like are dispersed along with the porous material powder in the liquid dispersion medium or are carried on the molded block or the adsorbent block. When it is the case, the offensive odor component and the like adsorbed on the porous material powder are decomposed by the photocatalyst and the like, and the adsorbing ability of the adsorbent block is regenerated. As the photocatalyst, as disclosed in Japanese Patent Laid-Open No. 8-257410 and the like, at least one kind of oxides of Ti, Cu, Zn, La, Mo, V, Sr, Ba, Ce, Sn, Fe, W, Mg and Al, a $TiO_2$—Pd composite oxide, and a sulfide, such as CdS can be employed. As the room temperature oxidation catalyst, at least one kind of a noble metal, such as Pd, Pt, Au, Ag, Rh and the like, an oxide of Mn, Ni, Cu, Fe or the like having an oxidation reduction potential and a composite oxide thereof can be employed. In the case where the photocatalyst is carried, it is preferred that the adsorbent block is irradiated with an ultraviolet ray for oxidation decomposition of a chemical substance, such as ammonia, a hydrocarbon and the like, thus adsorbed. A cathode tube and an LED can be used as the light source. The photocatalyst may also be activated by sunlight. In the case where sunlight is utilized, the adsorbent block is irradiated directly with or indirectly through a mirror or an optical fiber with sunlight taken from the outside.

In the production process of the first and second inventions, extrusion molding, compress ion molding and the like may be employed as the molding method.

In the production process of the first and second inventions, the continuous flow path may be either one extending straight or in a curved manner. It is preferred that the continuous flow path extends straight from the standpoint of a small flow path resistance. In order to produce an adsorbent block having straight continuous flow paths, the adsorbent block may have a honeycomb form. In this case, the molded block of the first step may be formed into a honeycomb form. In order to form the molded block in a honeycomb form, extrusion molding may be employed. The opening part forming the honeycomb form is not limited to a hexagon and may be such a shape that does not impair passage of a gas and a liquid, such as a triangle or a higher polygon or a circular shape, such as an ellipsoid.

On the other hand, when the continuous flow path extends in a curved manner, the air or the like passing through the continuous flow path is liable to collide on the wall constituting the continuous flow path to increase the flow path resistance, but it is considered that the adsorption efficiency is improved. In the case where an adsorbent block having continuous flow paths extending in a curved manner, such manner that a foaming agent is contained in the dispersion system, and the like may be employed. Continuous flow paths formed by connecting gaps each other that may be present among the porous material powder.

The adsorbent block obtained by the production process of the first and second inventions can be used as a cleaning filter in an air cleaning apparatus, such as an air cleaner. In this case, the cleaning filter is preferably provided on the downstream side of a dust collection filter and a dust collection device. This is because powder dusts are removed by a dust collecting filter or the like on the upstream side, so as to prevent clogging of the adsorbent block of the cleaning filter with the powder dusts.

It is preferred that the dust collecting filter that suffers clogging can be exchanged. Accordingly, in the case of an in-vehicle air conditioning apparatus, the dust collecting filter can be mounted as capable of being exchanged in a glove box or the like. Similarly, it is preferred that the cleaning filter can be exchanged. This is because in the case where the cleaning filter is broken or the like, the exchange thereof can be made easily. In order to mount the dust collecting filter and the cleaning filter as capable of being exchanged, it is preferred that these are provided in an air cleaning apparatus or the like by a holder.

The dust collecting filter is not particularly limited in the structure thereof, and a dust collecting material, such as cloth, nonwoven cloth, paper and the like, formed to have a pleated (wave) form can be employed. A dust collecting apparatus employing an electric dust collecting method where a high voltage is applied can also be employed. The dust collecting filter and the cleaning filter are arranged closely, preferably continuously, provided. According to the configuration, both of them can be compactly mounted. The shapes of the dust collecting filter, the cleaning filter and the like are appropriately designed corresponding to an air cleaning apparatus and the like, to which they are applied.

The adsorbent block obtained by the production process of the first and second inventions is demanded, for example when it is used for an in-vehicle air conditioner, to remove at least 40% of various gas components per passage of the air in the vehicle. As the adsorbent block of a honeycomb form that satisfies the demand, one having a proportion of the active carbon powder of 60% by mass or more and an area proportion occupied by the opening part of from 50 to 80% and from 500 to 1,000 cell/inch$^2$ can be used. When it is less than 500 cells/inch$^2$, the extent of the inlet is not sufficient to impair the adsorbing performance.

PREFERRED EMBODIMENTS FOR CARRYING OUT THE INVENTION (Tests)

The invention will be described below by way of Tests 1 to 6 with reference to FIGS. 1 to 14.

Figure 1:
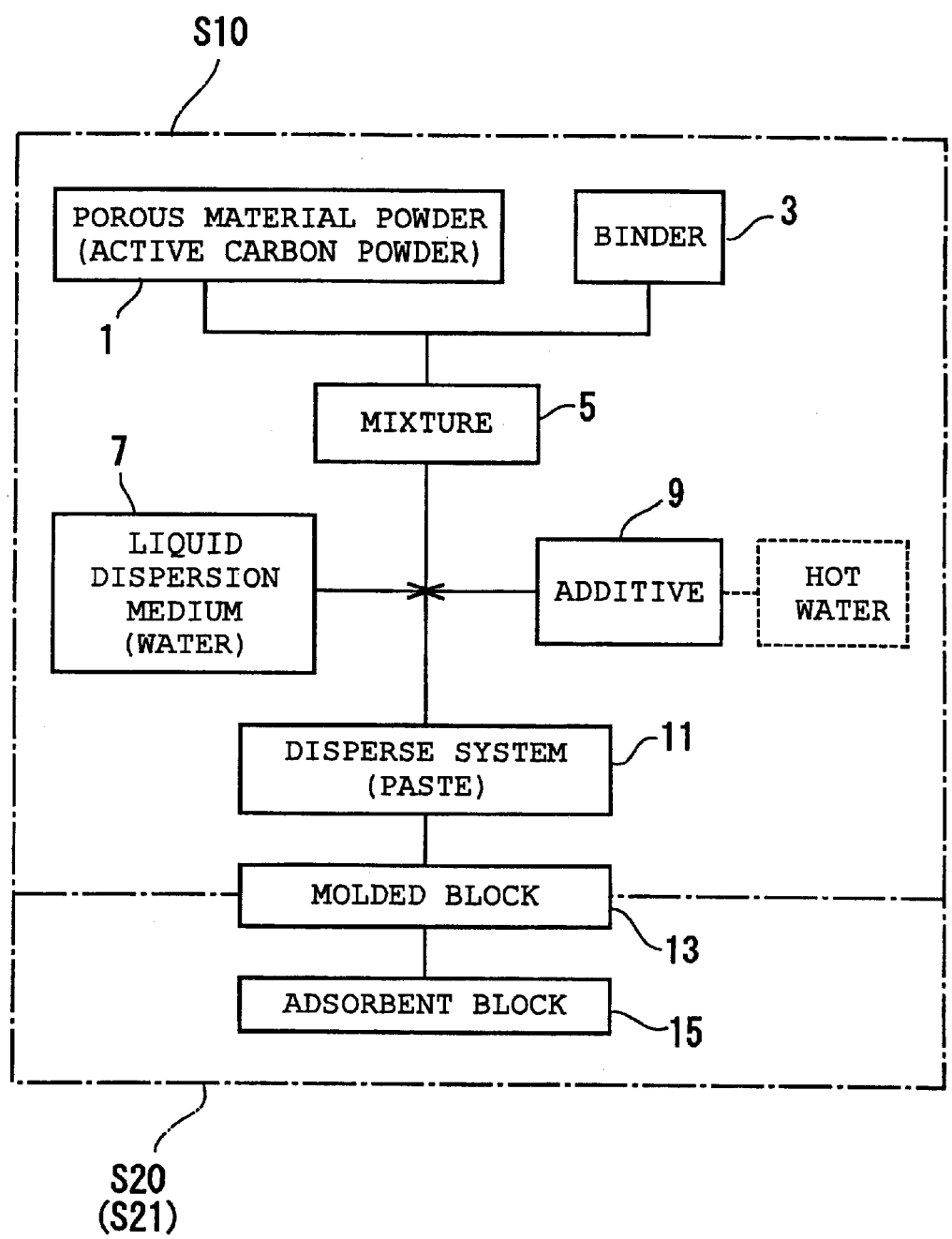
FIG. 1 is a process diagram of the production process of the adsorbent blocks relating to Examinations 1 to 5.

The following materials shown in FIG. 1 are prepared.

(1) Porous material powder 1 as solid disperse phase: active carbon powder produced by Takeda Chemical Industries, Ltd.

(2) Binder 3: water soluble binder for extrusion molding, "Serander" produced by Yuken Industry Co., Ltd., and methyl cellulose, "Metholose" produced by Shin-Etsu Chemical Co., Ltd.

(3) Additive 9 as shrinkage agent and area increasing agent

Additive A: agar for reagent produced by Wako Pure Chemical Industries, Ltd.

Additive B: general agar produced by Ina-shokuhin Industry Inc.

Additive C: agar for gelidium jelly produced by Ina-shokuhin Industry Inc.

Additive D: high water absorbing resin, "Aquapearl AP211DS (average particle diameter: 100 to 150 $\mu$m, water absorbing ability: 400 to 700 g/g)" produced by Mitsubishi Chemical Corp.

Additive E: high water absorbing resin obtained by pulverizing "Aquapearl AP215SS (average particle diameter: 44 $\mu$m or less, water absorbing ability: 400 to 700 g/g)" produced by the same company to an average particle diameter of 11 $\mu$m Additive F: high water absorbing resin obtained by pulverizing "Aquapearl AP215SS" produced by the same company to an average particle diameter of 15 $\mu$m Additive G: high water absorbing resin, "A1B (average particle diameter: 90 to 150 $\mu$m, water absorbing ability: 250 to 400 g/g)" produced by the same company Additive H: high water absorbing resin, "DS45 (average particle diameter: 350 to 550 $\mu$m, water absorbing ability: 200 $\mu$g/g)" produced by the same company Additive I: water absorbing resin, "DS50 (average particle diameter: 350 to 550 μm, water absorbing ability: 400 g/g)" produced by the same company The additives A to C have the following characteristics according to the jelly strength by Nichikansui-shiki measuring method and a sol viscosity coefficient at 85° C. by a B type rotation viscometer. In the Nichikansui-shiki measuring method, after an agar aqueous solution of 1.5% by mass is allowed to stand at 20° C. for 15 hours, a load is applied to 1 cm$^2$ of the agar surface in a gel form thus solidified, and the mass (g) of the load that can be retained on the agar surface for 20 seconds is measured.

That is, the additive A has a jelly strength of 630 g/cm$^2$ and a sol viscosity coefficient of 6.4 mPa·s. The additive B has a jelly strength of 730±20 g/cm$^2$ and a sol viscosity coefficient of 9±2 mPa·s. The additive C has a jelly strength of 950±50 g/cm$^2$ and a sol viscosity coefficient of 40±5 mPa·s.

(4) Liquid dispersion medium: water at room temperature or hot water at 90 to 100° C.

(Test 1)

As Test 1, the first step S10 and the second step S20 are conducted as shown in FIG. 1.

In the first step S10, the porous material powder 1 and the binder 3 are mixed in the ratios shown in Table 1 to form a mixture 5. The mixture 5, the additive 9 and water 7 are then mixed in the ratios shown in Table 1, followed by kneading.

TABLE 1

| Sample No. | Porous material powder (part by mass) | Binder (part by mass) | Additive Kind | Additive Mixing ratio (part by mass) | Water (part by mass) |
|---|---|---|---|---|---|
| 1-0 | 100 | 10 | — | 0 | 240 |
| 1-1 | 95 | 10 | F | 5 | 340 |
| 1-2 | 90 | 10 | F | 10 | 436 |
| 1-3 | 80 | 10 | F | 20 | 632 |
| 1-4 | 70 | 10 | F | 30 | 828 |
| 1-5 | 50 | 10 | F | 50 | 1,220 |
| 1-6 | 100 | 10 | — | 0 | 200 |
| 1-7 | 95 | 10 | F | 5 | 240 |
| 1-8 | 90 | 10 | F | 10 | 280 |
| 1-9 | 80 | 10 | F | 20 | 360 |
| 1-10 | 70 | 10 | F | 30 | 440 |
| 1-11 | 50 | 10 | F | 50 | 600 |

At this time, a water soluble binder for extrusion molding, "Serander" produced by Yuken Industry Co., Ltd., is used as the binder. The resulting pastes 11 are designated as Sample Nos. 1-0 to 1-11.

Figure 2:
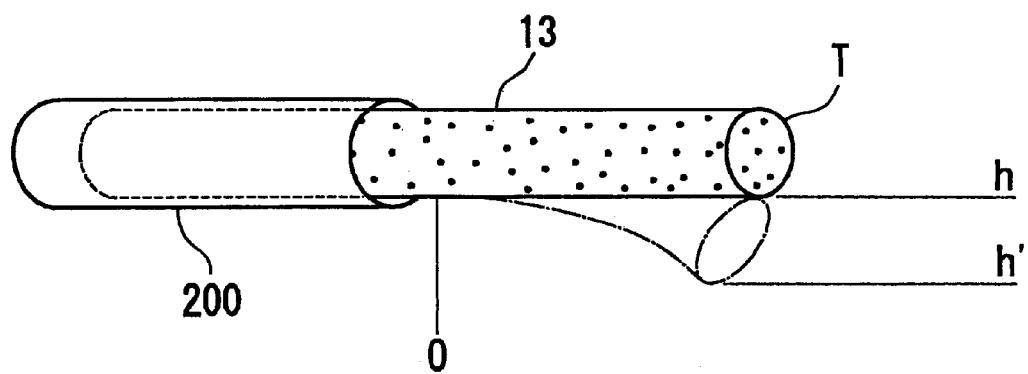
FIG. 2 is a perspective view of a molded block and so on of the samples relating to Tests 1 and 3.

The pastes 11 of Sample Nos. 1-0 to 1-10 each is extruded by hand from a cylinder (syringe) having an aperture having a diameter of 2 mm, and molded blocks 13 of Sample Nos. 1-0 to 1-10 having a cylindrical shape having a length of 5 cm and a diameter of 2 mm are formed as shown in FIG. 2.

In the subsequent second step S20, the respective molded blocks 13 are placed on powder paper and dried at 100° C. for 20 minutes as the liquid dispersion medium removing step S21. As a result, adsorbent blocks 15 are obtained as shown in FIG. 1.

The dimensions of the adsorbent blocks 15 are measured. The dimensions of the adsorbent blocks 15 of Sample Nos. 1-0 and 1-6 containing no additive 9 are designated as 100%, which are compared with the respective adsorbent blocks 15. The relationship between the proportion of the additive 9 (part by mass) and the dimensional ratio (%) of the adsorbent blocks 15 is obtained. The results are shown in FIG. 3.

Figure 3:
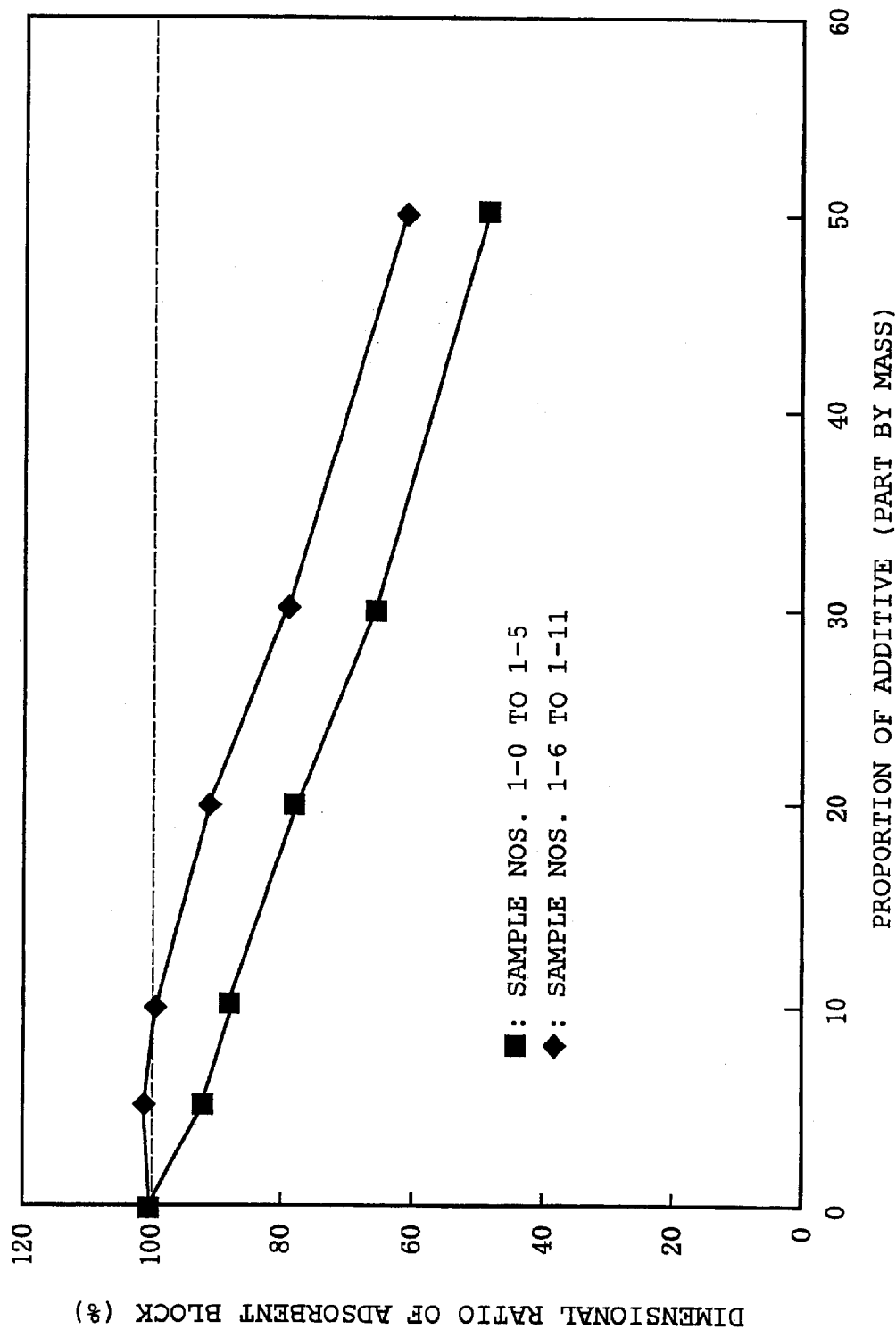
FIG. 3 is a graph showing the relationship between the proportion of the additive and the dimensional ratio of the adsorbent block relating to Test 1.

It is understood from FIG. 3 that in the case where the high water absorbing resin is employed as the additive 9, shrinkage is observed when the mixing ratio of the additive 9 is 10 parts by mass or more in the molded blocks 13 of Sample Nos. 1-7 to 1-11 having a small mixing ratio of water. In this case, shrinkage is observed even when the mixing ratio of the additive 9 is small in the molded blocks 13 of Sample Nos. 1-1 to 1-5 having a large mixing ratio of water, and thus it is understood that shrinkage is liable to occur when the proportion of water is increased.

A container of an inner capacity of 3 L having been adjusted to have an initial concentration of toluene of about 70 ppm is prepared, and 0.3 g of the adsorbent blocks 15 of Sample Nos. 1-0, 1-7 to 1-11 are placed therein. The change of the concentration of toluene after the lapse of 10 minutes is obtained by the following equation.

((initial concentration−concentration after 10 minutes)/initial concentration)×100

Figure 4:
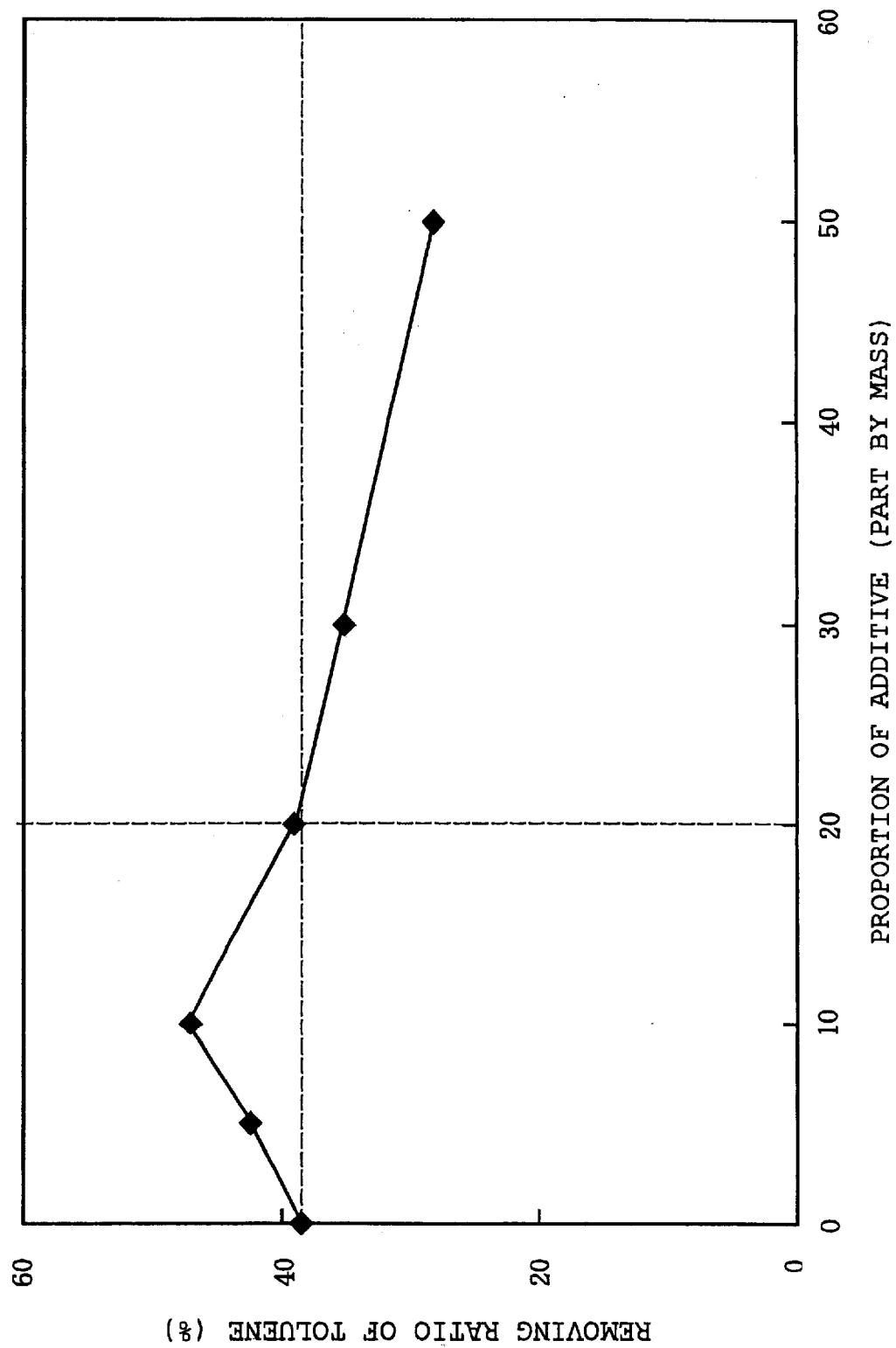
FIG. 4 is a graph showing the relationship between the proportion of the additive and the removing ratio of toluene relating to Test 1.

The relationship between the proportion of the additive 9 (part by mass) and the removing ratio of toluene (%) is shown in FIG. 4. It is understood from FIG. 4 that in the case where the high water absorbing resin is used as the additive 9, the function as the pore increasing agent of the high water absorbing resin contributes to the improvement of the adsorption efficiency until the mixing ratio of the additive 9 of 10 parts by mass. However, when the mixing ratio of the additive 9 exceeds 20 parts by mass, the adsorption efficiency is not sufficient.

Accordingly, it is understood that, in the case where the high water absorbing resin is employed as the additive 9, the effect of increasing the surface area of the adsorbent block 15 is exhibited in the range of the mixing ratio of the additive 9 of 20 parts by mass or less, so as to exhibit excellent adsorption efficiency. When the additive 9 is mixed at an amount exceeding 20 parts by mass, no effect of increasing the surface area of the adsorbent block 15 is obtained, and improvement in adsorption efficiency cannot be expected. When the mixing ratio of the additive 9 exceeds 20 parts by mass, it is considered that since the proportion of the high water absorbing resin present in the adsorbent block 15 is increased, the proportion of the porous material powder becomes small, and thus the surface area of the adsorbent block 15 become insufficient.

It is found from FIG. 4 that the improvement of adsorption efficiency is found when the mixing ratio of the high water absorbing resin as the additive 9 is 10 parts by mass or less, and it is understood that this is because the high water absorbing resin itself is shrinked to form pores in the adsorbent block 15, whereby the surface area of the adsorbent block 15 is increased.

(Test 2)

As shown in FIG. 1, the first step S10 and the second step S20 are conducted.

In the first step S10, the porous material powder 1 and the binder 3 are mixed in the ratios shown in Table 2 to form a mixture 5. The mixture 5, the additive 9 and water 7 are then mixed in the ratios shown in Table 2, followed by kneading.

TABLE 2

| Sample No. | Porous material powder (part by mass) | Binder (part by mass) | Additive Kind | Additive Mixing ratio (part by mass) | Water (part by mass) |
|---|---|---|---|---|---|
| 2-0 | 100 | 20 | — | 0 | 164 |
| 2-1 | 90 | 20 | F | 10 | 250 |
| 2-2 | 80 | 20 | F | 20 | 250 |
| 2-3 | 70 | 20 | F | 30 | 250 |

At this time, a water soluble binder for extrusion molding, "Serander" produced by Yuken Industry Co., Ltd., is used as the binder. The resulting pastes 11 are designated as Sample Nos. 2-0 to 2-3.

Extrusion molding is conducted at an extrusion pressure of 9 Kgf/cm$^2$ with the pastes 11 of Sample Nos. 2-0 to 2-3 by using an extrusion die. As a result, the molded blocks 13 of Sample Nos. 2-0 to 2-3 having a honeycomb form of 500 cells/inch$^2$ having an opening part of a rectangular form of 0.9 mm×0.9 mm surrounded by a wall thickness of about 0.2 mm are formed.

In the subsequent second step S20, the molded blocks 13 of Sample Nos. 2-0 to 2-3 are wrapped with a heat resistant plastic film and allowed to stand at 85° C. for 2 hours as the liquid dispersion medium removing step S21. After detaching the plastic film and removing moisture on the surface of the molded blocks 13 of Sample Nos. 2-0 to 2-3, they are again wrapped with a plastic film and allowed to stand at 85° C. for 2 hours. The operations are repeated for several times. Thereafter, the molded blocks 13 of Sample Nos. 2-0 to 2-3, from which the plastic film has been detached, is allowed to stand in a drying furnace maintained at 100° C. for 2 hours, so as to completely dry them. The adsorbent blocks 15 of Sample Nos. 2-0 to 2-3 are cut at a thickness of 8 mm. According, to the procedures, the adsorbent blocks 15 of Sample Nos. 2-0 to 2-3 are produced.

Figure 5:
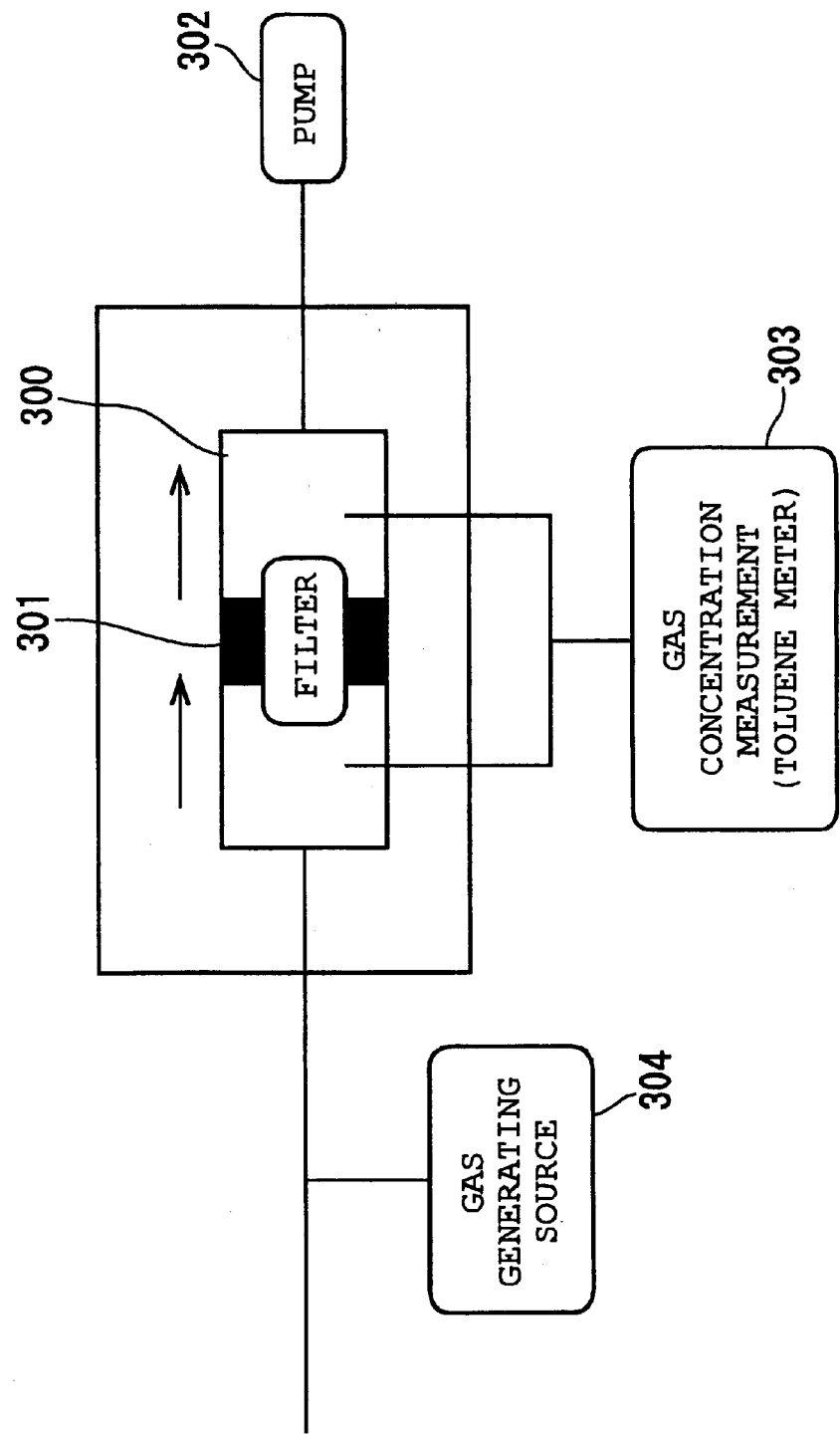
FIG. 5 is a schematic diagram of a measurement apparatus relating to Test 2.

A cleaning filter 301 is constituted by the cut adsorbent block 15 as shown in FIG. 5, and the filter 301 is provided inside a cylindrical container 300 under a sealed state. Toluene is generated at a concentration of 80 ppm by a gas generating source 304 on the upstream side of the container 300, and the air containing toluene is sucked at a flow rate of 1.2 m/sec from the downstream side of the container 300 by a pump 302. At this time, the gas concentrations before and after the cleaning filter 301 inside the container 300 are measured by a toluene meter 303. According to the procedures, the proportion (part by mass) of the additive 9 in the adsorbent block 15 of the filter 301 and the removing ratio (%) of toluene per one passage are measured. The results are shown in FIG. 6.

Figure 6:
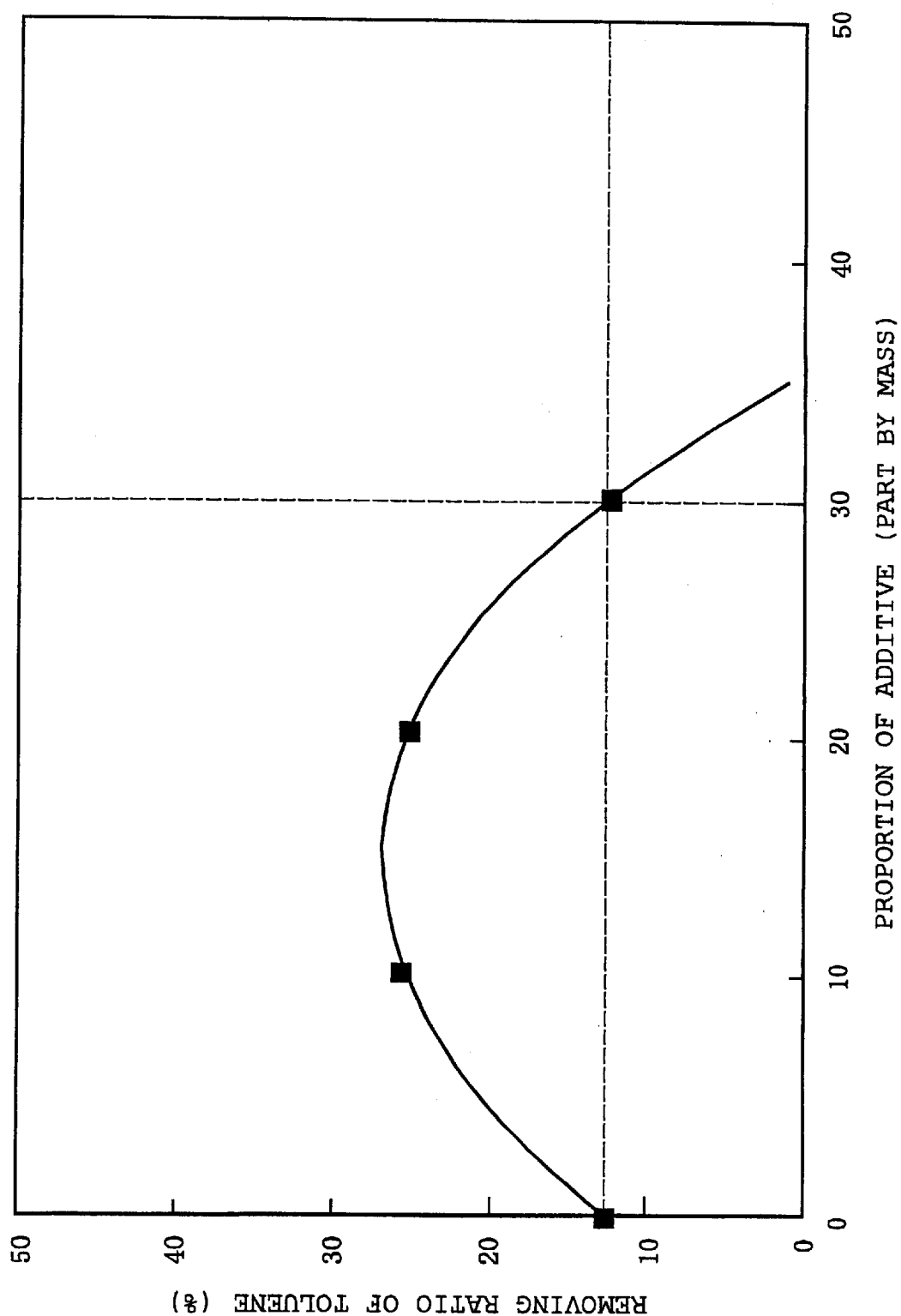
FIG. 6 is a graph showing the relationship between the proportion of the additive and the removing ratio of toluene relating to Test 2.

It is understood from FIG. 6 that in the case where the high water absorbing resin is employed as the additive 9, the adsorption efficiency of the adsorbent block 15 having the mixing ratio of the additive 9 exceeding 30 parts by mass is lower than the adsorbent block 15 of Sample No. 2-0 containing no high water absorbing resin. Therefore, it is understood that the mixing ratio of the additive 9 is preferably 30 parts by mass of less. It is more preferred that the mixing ratio of the additive 9 is from 10 to 20 parts by mass. It is considered that when the kinds of the active carbon powder and the high water absorbing resin are changed, the maximum mixing ratio, i.e., the threshold value where the adsorption efficiency is lower than the case where no high water absorbing resin is contained, can be increased to 40 parts by mass.

(Test 3)

The first and second steps S10 and S20 are conducted as shown in FIG. 1 as similar to Tests 1 and 2.

In the first step S10, the porous material powder 1 and the binder 3 are mixed in the ratios shown in Table 3 to form a mixture 5. The mixture 5 is swelled with water 7 or hot water, and the additive 9 is then mixed in the ratios shown in Table 3, followed by kneading.

TABLE 3

| Sample No. | Porous material powder (part by mass) | Binder (part by mass) | Additive Kind | Mixing ratio (part by mass) | Water (part by mass) |
| --- | --- | --- | --- | --- | --- |
| 3-1 | 80 | 10 | A | 20 | 200 |
| 3-2 | 80 | 10 | A | 20 | 300 |
| 3-3 | 80 | 10 | B | 20 | 200 |
| 3-4 | 80 | 10 | B | 20 | 250 |
| 3-5 | 80 | 10 | C | 20 | 200 |
| 3-6 | 80 | 10 | C | 20 | 250 |
| 3-7 | 80 | 10 | C | 20 | 300 |
| 3-8 | 80 | 10 | D | 20 | 250 |
| 3-9 | 80 | 10 | D | 20 | 300 |
| 3-10 | 80 | 10 | D | 20 | 400 |
| 3-11 | 80 | 10 | E | 20 | 200 |
| 3-12 | 80 | 10 | E | 20 | 250 |
| 3-13 | 80 | 10 | E | 20 | 300 |
| 3-14 | 80 | 10 | F | 20 | 175 |
| 3-15 | 80 | 10 | F | 20 | 200 |
| 3-16 | 80 | 10 | F | 20 | 250 |
| 3-17 | 80 | 10 | F | 20 | 300 |
| 3-18 | 80 | 10 | G | 20 | 300 |
| 3-19 | 80 | 10 | G | 20 | 350 + 50 |
| 3-20 | 80 | 10 | G | 20 | 150 + 250 |
| 3-21 | 80 | 10 | H | 20 | 500 |
| 3-22 | 80 | 10 | I | 20 | 400 |

At this time, the additives A to C are dissolved in hot water at from 90 to 100° C. corresponding to the proportion of water shown in Table 3 and mixed with the mixture 5, followed by kneading. The respective resulting pastes 11 are designated as Sample Nos. 3-1 to 3-22. In the paste 11 of Sample No. 3-19, 350 parts by mass of water 7 is previously mixed with the additive G, which is mixed with the mixture 5 and 50 parts by mass of water 7, followed by kneading. Similarly, in the paste 11 of Sample No. 3-20, 150 parts by mass of water 7 is previously mixed with the additive G, which is mixed with the mixture 5 and 250 parts by mass of water 7, followed by kneading.

Molded blocks 13 having a cylindrical shape having a length of 5 cm and a diameter of 2 mm for Sample Nos. 3-1 to 3-22 are formed as similar to Test 1.

The hardness of the molded blocks 13 of Sample Nos. 3-1 to 3-22 is measured by using a clay hardness meter produced by NGK Spark Plug Co., Ltd. The results are shown in Table 4. In Table 4, samples where substantially no molded block 13 can be formed and the hardness cannot be measured are shown by "-".

TABLE 4

| Sample No. | Hardness | Soft degree (mm) | Linear shrinkage ratio (%) |
| --- | --- | --- | --- |
| 3-1 | 8.0 | / | 15.30 |
| 3-2 | 3.0 | / | 23.70 |
| 3-3 | 7.5 | 5 | 17.20 |
| 3-4 | 6.5 | 15 | 20.20 |
| 3-5 | 10.0 | 4 | 14.30 |
| 3-6 | 7.0 | 6 | 17.90 |
| 3-7 | 5.0 | 11 | 20.40 |
| 3-8 | — | — | — |
| 3-9 | 3.0 | 17 | 5.37 |
| 3-10 | 0.0 | 25 | 17.49 |
| 3-11 | 8.0 | — | 5.09 |
| 3-12 | 4.0 | 10 | 9.35 |
| 3-13 | 1.0 | 17 | 13.80 |
| 3-14 | — | — | — |
| 3-15 | 9.0 | 7 | 3.83 |
| 3-16 | 4.0 | 17 | 7.32 |

TABLE 4-continued

| Sample No. | Hardness | Soft degree (mm) | Linear shrinkage ratio (%) |
|---|---|---|---|
| 3-17 | 2.0 | 19 | 9.86 |
| 3-18 | — | — | — |
| 3-19 | — | — | — |
| 3-20 | — | — | — |
| 3-21 | — | — | — |
| 3-22 | — | — | — |

As shown in FIG. 2, the molded blocks 13 of Sample Nos. 3-1 to 3-22 each is inserted into a cylindrical container 200, and the center part O to one end T of the molded block 13 is exposed and maintained horizontally. The end T of the molded block 13 is bent by gravity and the difference of the lower end of the end T h–h' is measured as a soft degree (mm). The results thereof are also shown in Table 4. In Table 4, samples that are not measured are shown by "/", and samples where substantially no molded block 13 can be formed and the soft degree cannot be measured are shown by "-".

Subsequently, in the second step S20 shown in FIG. 1, the liquid dispersion medium removing step S21 is conducted as similar to Test 1, so as to produce adsorbent blocks 15 of Sample Nos. 3-1 to 3-22.

Figure 7:
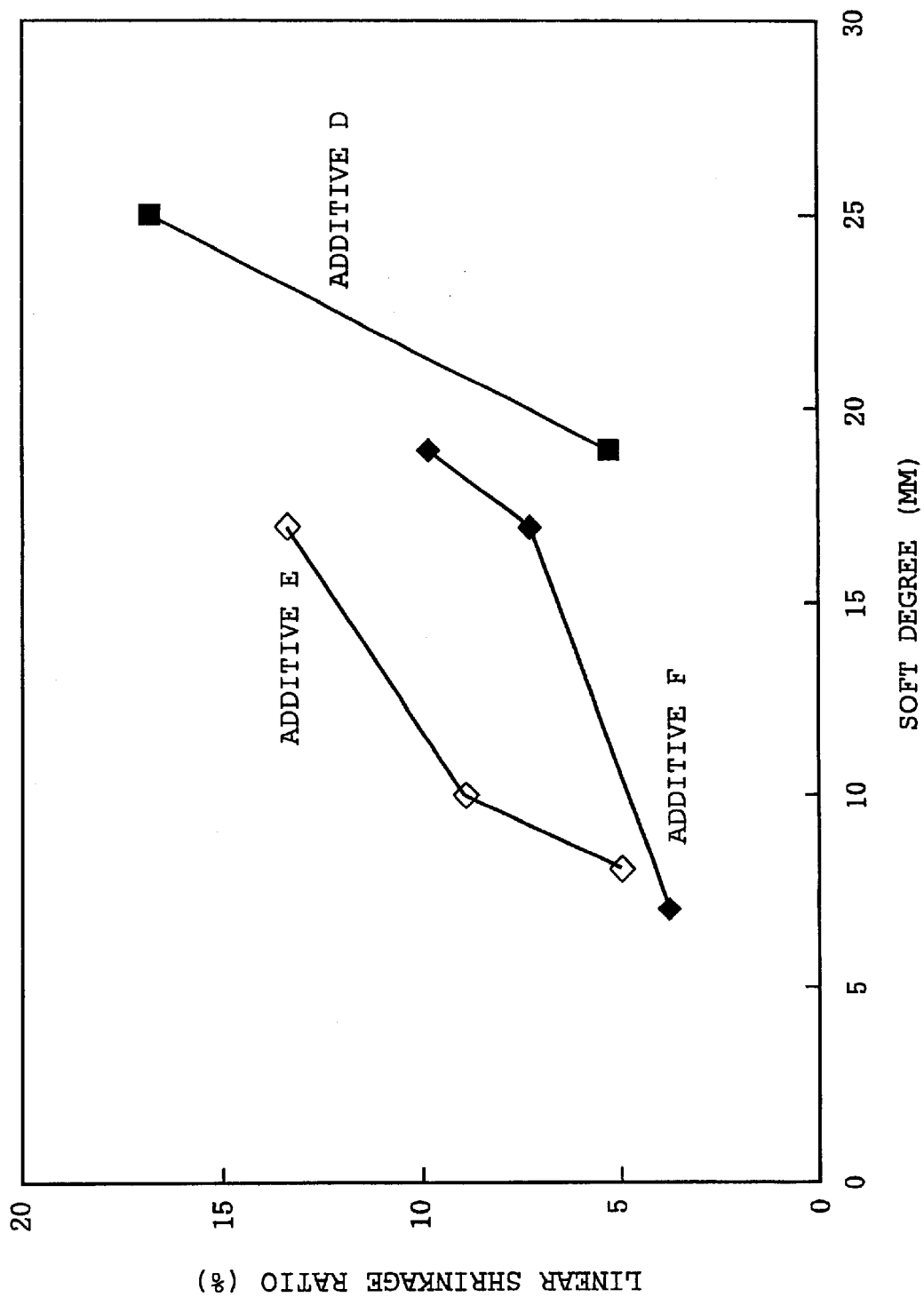
FIG. 7 is a graph showing the relationship between the soft degree and the linear shrinkage ratio relating to Test 3.
Figure 8:
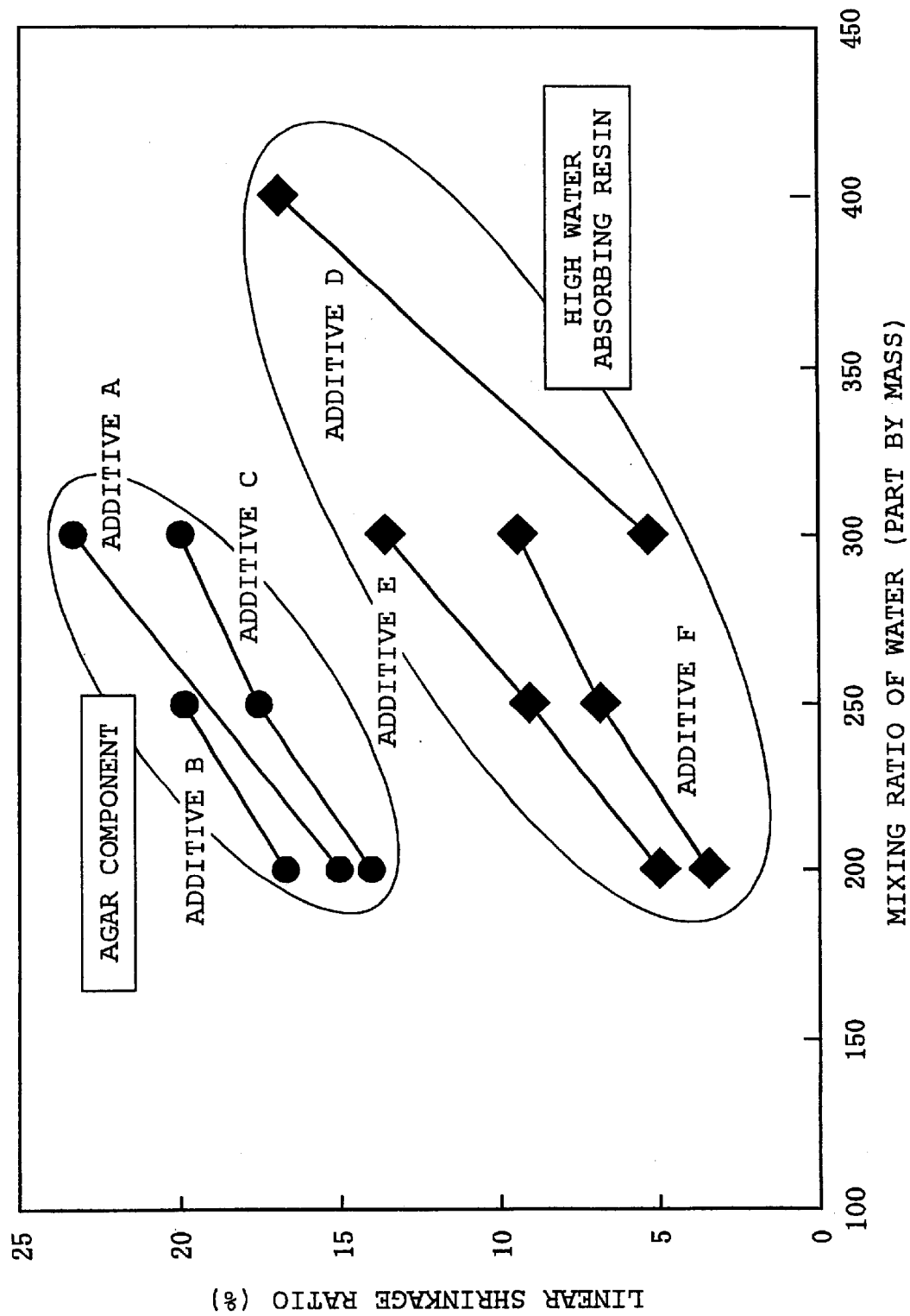
FIG. 8 is a graph showing the relationship between the mixing ratio of water and the linear shrinkage ratio relating to Test 3.

During the operation, the molded blocks 13 and the adsorbent blocks 15 of Sample Nos. 3-1 to 3-22 are measured for the shrinkage ratio of the diameter in terms of a linear shrinkage ratio (%). The results thereof are also shown in Table 4. In Table 4, samples where substantially no molded block 13 can be formed and the linear shrinkage ratio cannot be measured are shown by "-". The relationship between the soft degree (mm) and the linear shrinkage ratio (%) for the molded blocks 13 and adsorbent blocks 15 of Sample Nos. 3-8 to 3-17 is shown in FIG. 7. Furthermore, the relationship between the mixing ratio of water (part by mass) and the linear shrinkage ratio (%) for the molded blocks 13 and adsorbent blocks 15 of Sample Nos. 3-1 to 3-22 is shown in FIG. 8.

It is understood from Table 4 and FIG. 7 that depending on the selection of the additive 9, there are cases where even the molded block 13 cannot be formed, and conspicuous differences are found in linear shrinkage ratio.

Under the circumstances, in the case where the high water absorbing resin is selected as the additive 9, it is understood that the average particle diameter of the high water absorbing resin is necessarily reduced in the case where the soft degrees are substantially the same, and the extents of the dimensional stability are equivalent. On the other hand, it is understood from Table 4 and FIG. 8 that the molded blocks 13 of Sample Nos. 3-1 to 3-7 using the agar component of the additives A to D exhibit a high linear shrinkage ratio with a small mixing ratio of water in comparison to the molded blocks 13 of Sample Nos. 3-8 to 3-17 using the high water absorbing resin of the additives D to F. It is also understood that when the agar component is used as the additive 9, the particle diameter of the additive 9 is not necessarily considered, and the mixing ratio of water can be reduced, whereby excellent working property is exhibited. This is because the agar component contains agarose.

(Test 4)

The first and second steps S10 and S20 are conducted as shown in FIG. 1 as similar to Tests 1 through 3.

In the first step S10, the porous material powder 1 and the binder 3 are mixed in the ratios shown in Table 5 to form a mixture 5. The mixture 5, the additive 9 and water 7 or hot water are mixed in the ratios shown in Table 5, followed by kneading.

TABLE 5

| | Porous material | Binder | Additive | | Water |
|---|---|---|---|---|---|
| Sample No. | powder (part by mass) | (part by mass) | Kind | Mixing ratio (part by mass) | (part by mass) |
| 4-1 | 90 | 10 | A | 10 | 133.2 |
| 4-2 | 90 | 10 | A | 10 | 157.5 |
| 4-3 | 90 | 10 | A | 10 | 180 |
| 4-4 | 80 | 10 | F | 20 | 116.8 |
| 4-5 | 80 | 10 | F | 20 | 140 |

At this time, methyl cellulose, "Metholose" produced by Shin-Etsu Chemical Co., Ltd., is used as the binder 3. The resulting pastes 11 are designated as Sample Nos. 4-1 to 4-5.

Extrusion molding is conducted with the pastes 11 of Sample Nos. 4-1 to 4-5 by using an extrusion die as similar to Test 2, so as to form the molded blocks 13 having a honeycomb form of 500 cells/inch$^2$.

Subsequently, in the second step S20, the liquid dispersion medium removing step S21 is conducted as similar to Test 2, so as to produce adsorbent blocks 15 of Sample Nos. 4-1 to 4-5.

The adsorbent blocks 15 of Sample Nos. 4-1 to 4-5 are measured for the number of cells per 1 inch$^2$ (1/inch$^2$). The relationship between the mixing ratio of water (part by mass) and the number of cells (1/inch$^2$) of the adsorbent blocks 15 for Samples Nos. 4-1 to 4-5 is shown in FIG. 9.

Figure 9:
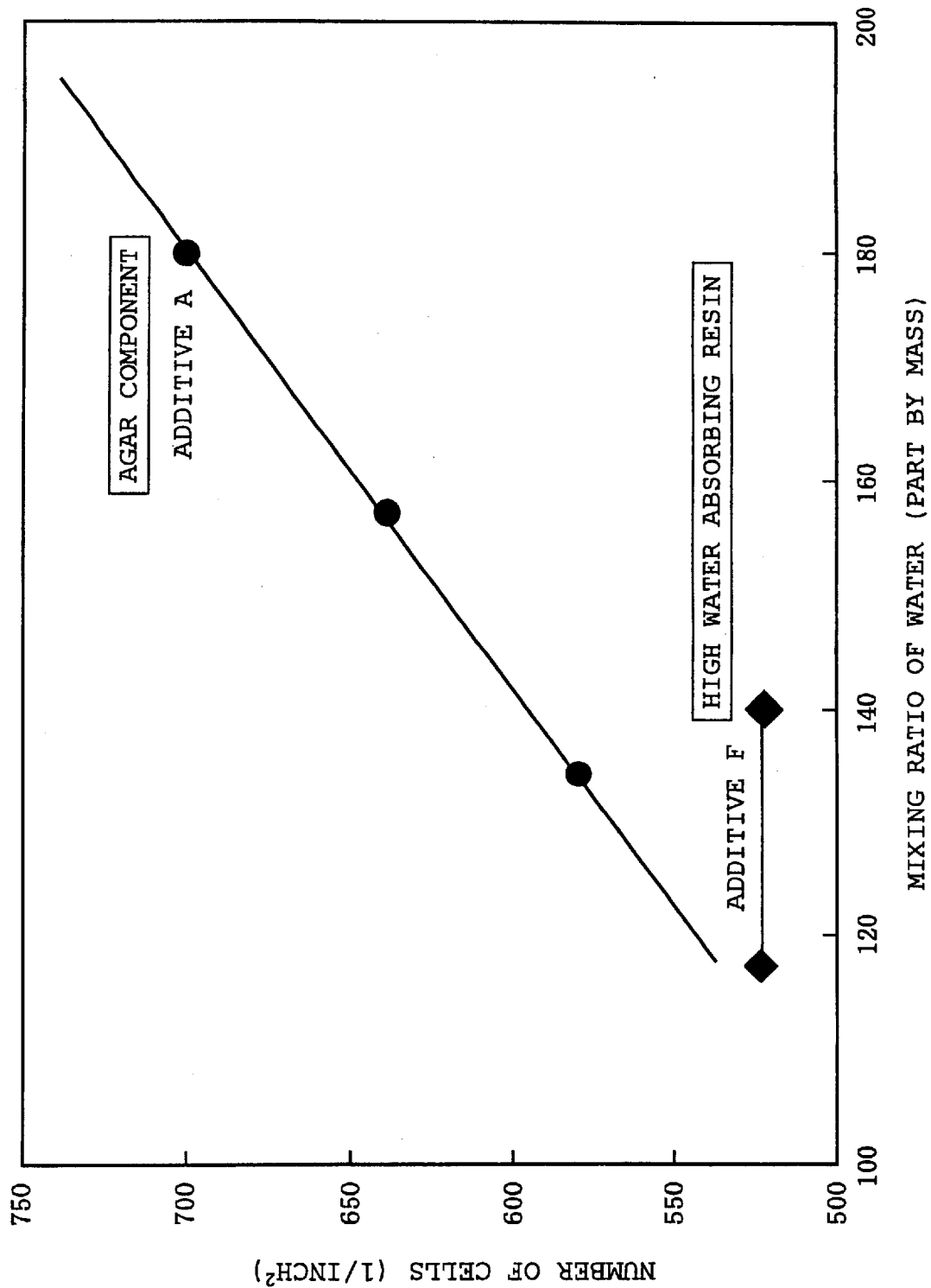
FIG. 9 is a graph showing the relationship between the mixing ratio of water and the number of cells relating to Test 4.

It is understood from FIG. 9 that in the adsorbent blocks 15 of Sample Nos. 4-4 and 4-5 using the high water absorbing resin of the additive F, the number of cells per 1 inch$^2$ is not changed in the mixing ratios of water of 116.8 parts by mass and 140 parts by mass. On the other hand, in the adsorbent blocks 15 of Samples Nos. 4-1 to 4-3 using the agar component of the additive A, the number of cells per 1 inch$^2$ is effectively increased associated with the increase of the mixing ratio of water when the mixing ratios of the porous material powder 1, the additive 9 and binder 3 are same. This is because the agar component is infinitely swelled in the paste 11.

Therefore, when the agar component is selected as the additive 9, because the molded block 13 formed in the first step S10 is effectively shrinked at a high shrinkage ratio in the liquid dispersion medium removing step S21 of the second step S20, the number of cells per unit area of the adsorbent block 15 can be extremely effectively increased without so increasing the number of cells per unit area of the molded block 13 itself.

(Test 5)

The number of cells (1/inch$^2$) and the removing ratio of toluene per one passage (%) are measured as similar to Test 2 for the adsorbent blocks 15 of Sample Nos. 4-1 and 4-2 obtained in Test 4. The results are shown in FIG. 10.

Figure 10:
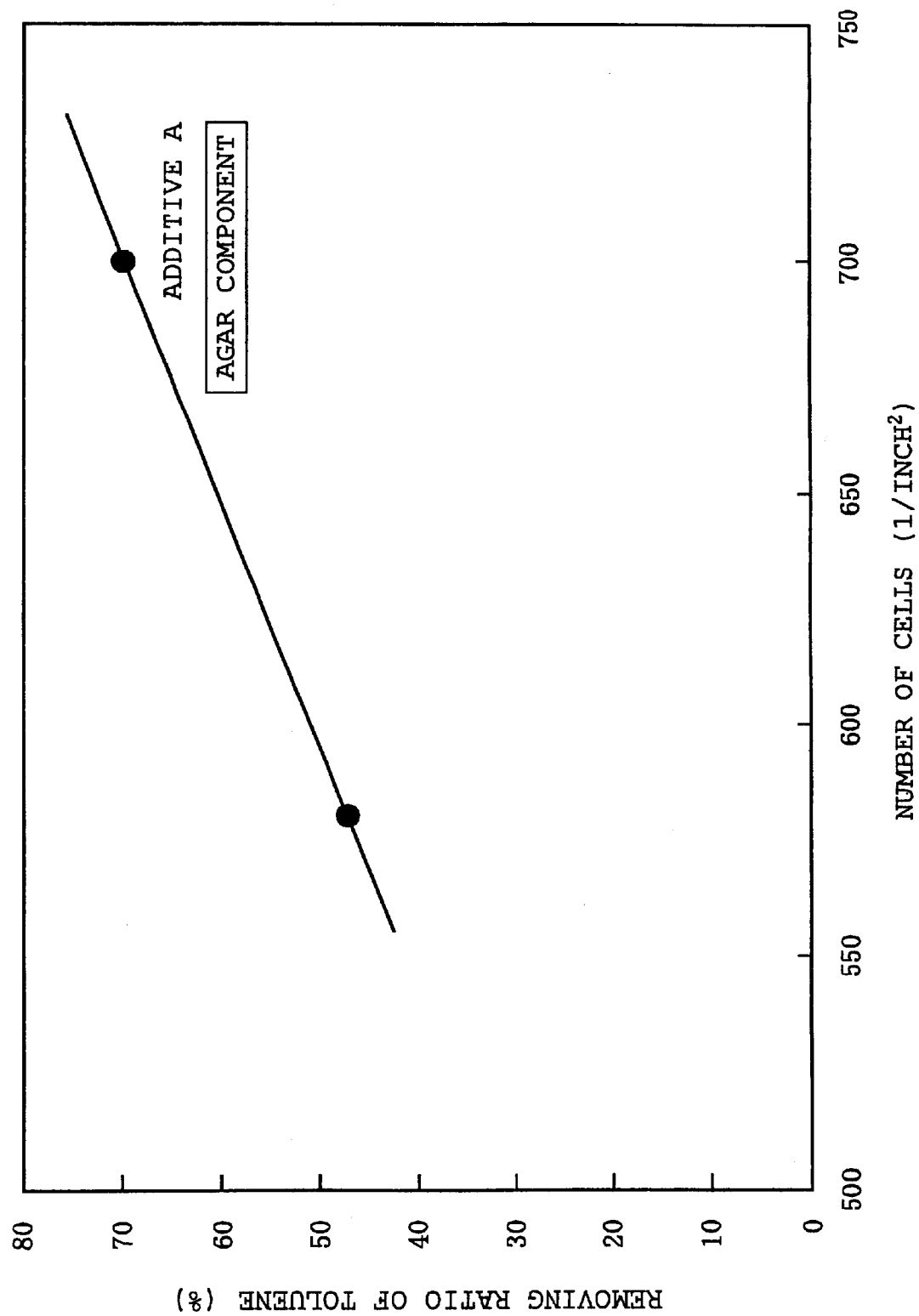
FIG. 10 is a graph showing the relationship between the number of cells of the adsorbent block and the removing ratio of toluene relating to Test 5.

It is understood from FIG. 10 that in the adsorbent blocks 15 of Sample Nos. 4-1 and 4-2 using the agar component as the additive 9, the contact area with the offensive odor component and the like is large, and toluene can be removed at a high adsorption efficiency in proportion to the number of cells per unit area. In particular, the adsorbent blocks 15 have cells of a honeycomb form extending linearly, and the flow path resistance is small.

It is also understood that when the agar component is selected as the additive 9, because the number of cells per unit area of the adsorbent blocks 15 can be extremely effectively increased without so increasing the number of cells per unit area of the molded block 13 itself, the production of an extrusion die for obtaining the molded block 13 is not difficult, and the particle diameter of the additive 9 is not necessarily considered, whereby the reduction of the production cost is realized.

(Test 6)

Figure 11:
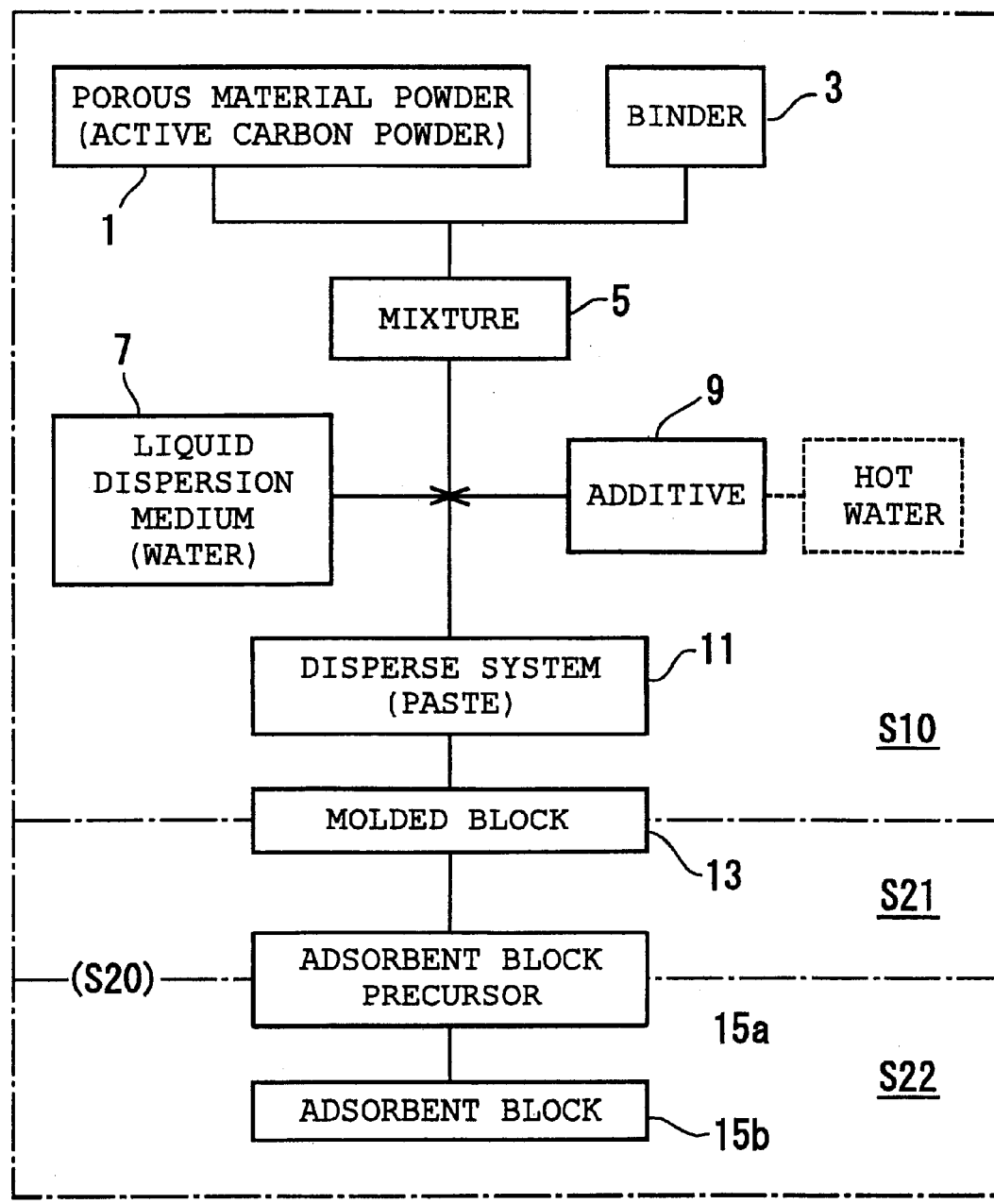
FIG. 11 is a process diagram of the production process of the adsorbent block relating to Test 6.

As shown in FIG. 11, the first and second steps S10 and S20 are conducted as similar to Tests 1 to 4.

In the first step S10, the porous material powder 1 and the binder 3 are mixed in the ratios shown in Table 6 to form a mixture 5. The mixture 5, the additive 9 and water 7 or hot water are mixed in the ratios shown in Table 6, followed by kneading. The ratios of the additive with respect to the total amount of water and the additive are also shown in Table 6. The resulting pastes 11 are designated as Sample Nos. 6-0 to 6-2.

TABLE 6

| Sample No. | Porous material powder (part by mass) | Binder (part by mass) | Additive Kind | Additive Mixing ratio (part by mass) | Water (part by mass) | Additive/ (water + additive) (%) |
|---|---|---|---|---|---|---|
| 6-0 | 100 | 9.9 | — | 0 | 120.9 | — |
| 6-1 | 100 | 7.0 | A | 4.1 | 123.9 | 3.1 |
| 6-2 | 100 | 11.0 | A | 11.0 | 222.0 | 5.0 |

Extrusion molding is conducted with the pastes 11 of Sample Nos. 6-0 to 6-2 by using an extrusion die as similar to Test 2, so as to form the molded blocks 13 having a honeycomb form of 500 cells/inch$^2$.

Subsequently, in the second step S20, the liquid dispersion medium removing step S21 is conducted as similar to Test 2, so as to produce adsorbent block precursors 15a of Sample Nos. 6-0 to 6-2. Thereafter, as the heating step of the second step S20, the adsorbent block precursors 15a of Sample Nos. 6-0 to 6-2 are heated at 200° C. for 50 hours. Accordingly, adsorbent blocks 15b of Sample Nos. 6-0 to 6-2 are produced.

The adsorbent block precursors 15a of Sample Nos. 6-0 to 6-2 are measured for the number of cells per 1 inch$^2$ (1/inch$^2$), the surface area per 1 g (m$^2$/g) and the pore volume per 1 g (ml/g). The results are shown in Table 7. The adsorbent blocks 15b of Sample Nos. 6-0 to 6-2 are measured for the number of cells per 1 inch$^2$ (1/inch$^2$), the surface area per 1 g (m$^2$/g) and the pore volume per 1 g (ml/g). The results are shown in Table 8.

TABLE 7

| | Adsorbent block precursor | | |
|---|---|---|---|
| Sample No. | Number of cells (1/inch$^2$) | Surface area (m$^2$/g) | Pore volume (ml/g) |
| 6-0 | 500 | 520 | 0.498 |
| 6-1 | 500 | 610 | 0.485 |
| 6-2 | 700 | 606 | 0.440 |

TABLE 8

| | Adsorbent block | | |
|---|---|---|---|
| Sample No. | Number of cells (1/inch$^2$) | Surface area (m$^2$/g) | Pore volume (ml/g) |
| 6-0 | 500 | 540 | 0.520 |
| 6-1 | 500 | 730 | 0.620 |
| 6-2 | 700 | 757 | 0.565 |

It is understood from Table 7 and Table 8 that in Sample Nos. 6-1 and 6-2 using the agar component as the additive 9, when the heating step S22 is applied to the adsorbent block precursors 15a to obtain the adsorbent blocks 15b, the additive 9 is disappeared to increase the surface area and to increase the pore volume. Therefore, in the adsorbent blocks 15b, the active carbon powder 1 that is present in a deep place of the wall constituting the cells is also utilized to increase the contact area with the offensive odor component and the like, whereby the adsorption efficiency is extremely high.

Figure 12:
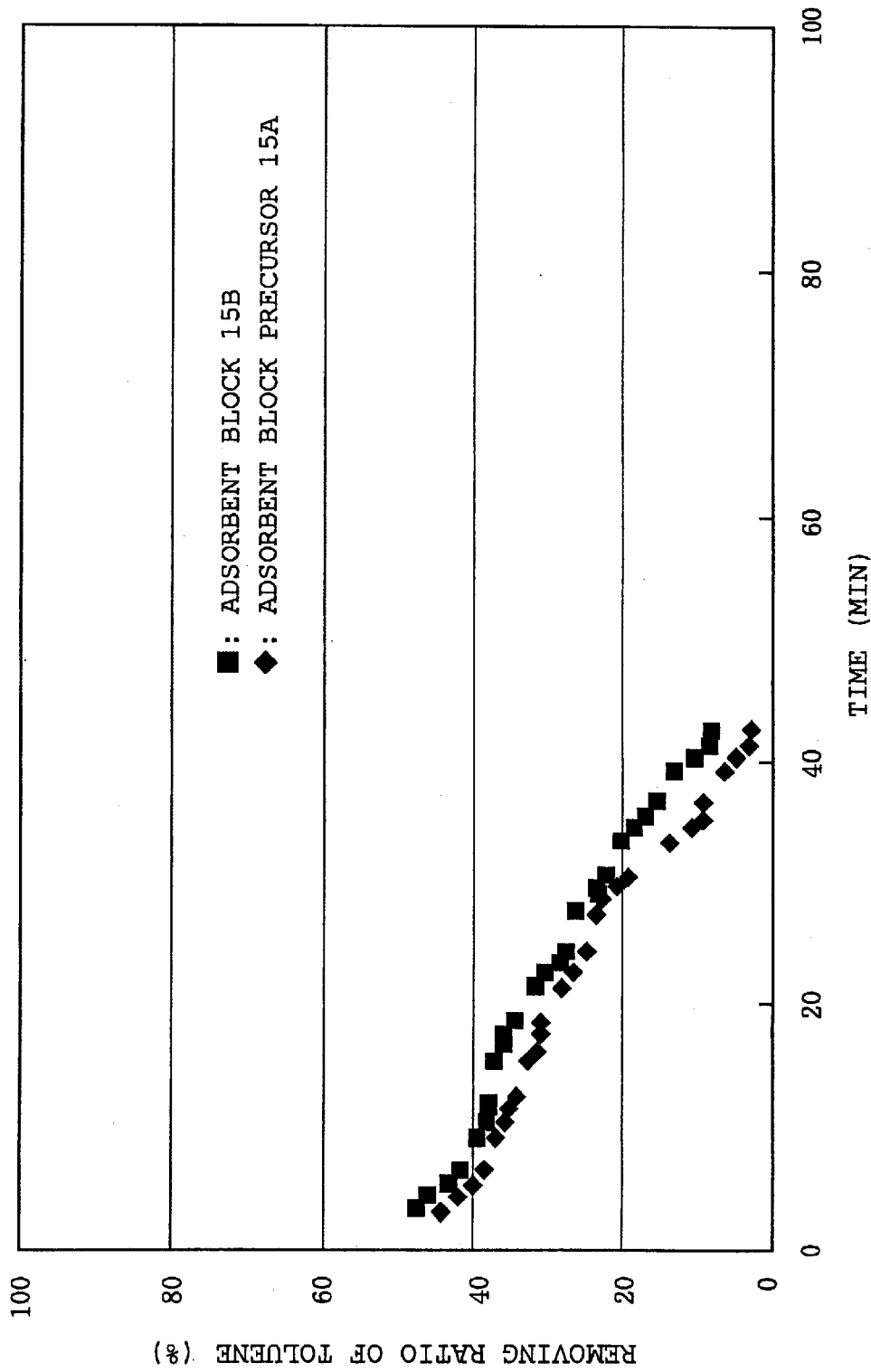
FIG. 12 is a graph showing the relationship between the time and the removing ratio of toluene in the sample relating to Test 6.
Figure 13:
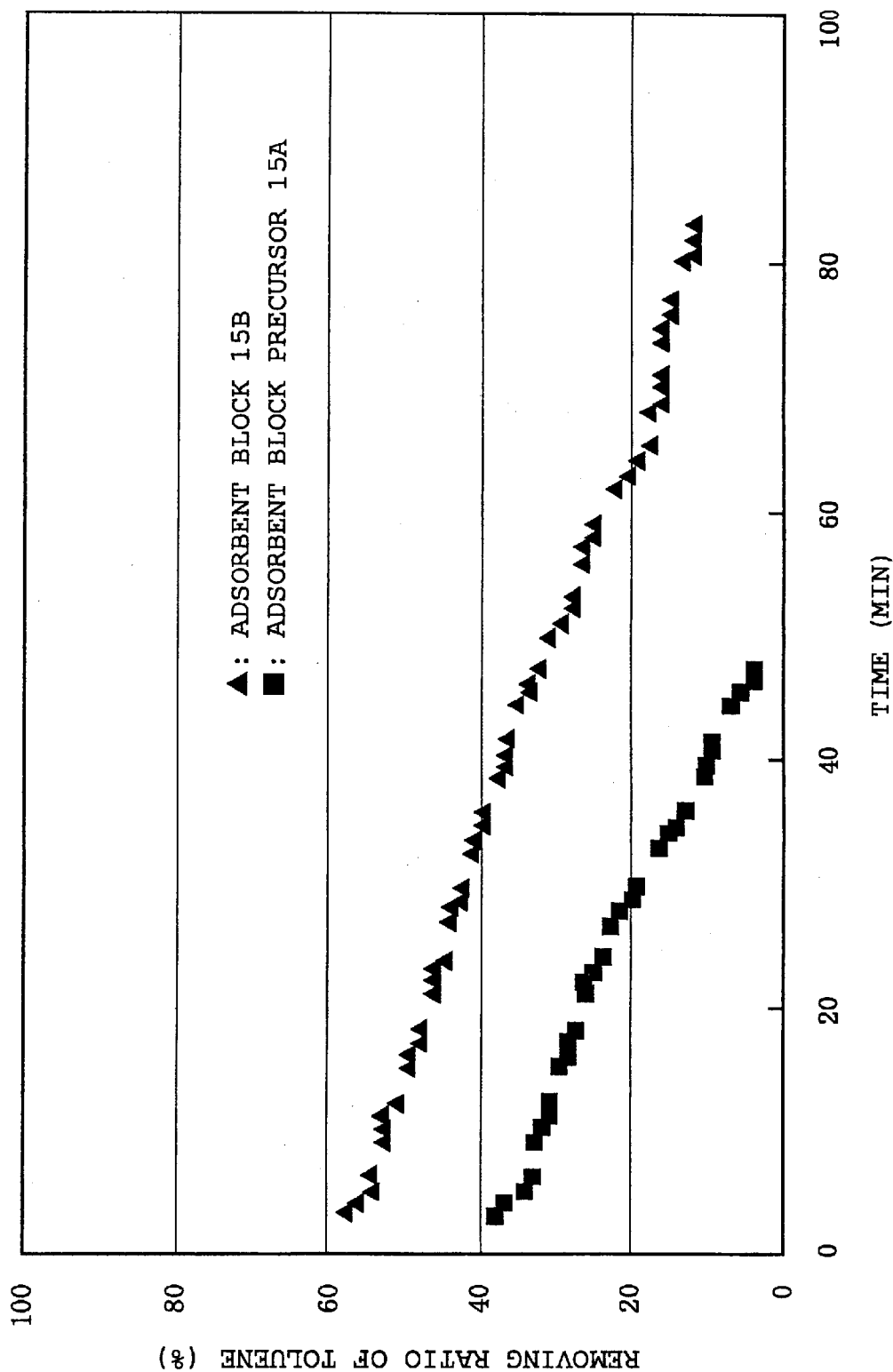
FIG. 13 is a graph showing the relationship between the time and the removing ratio of toluene in the sample relating to Test 6.
Figure 14:
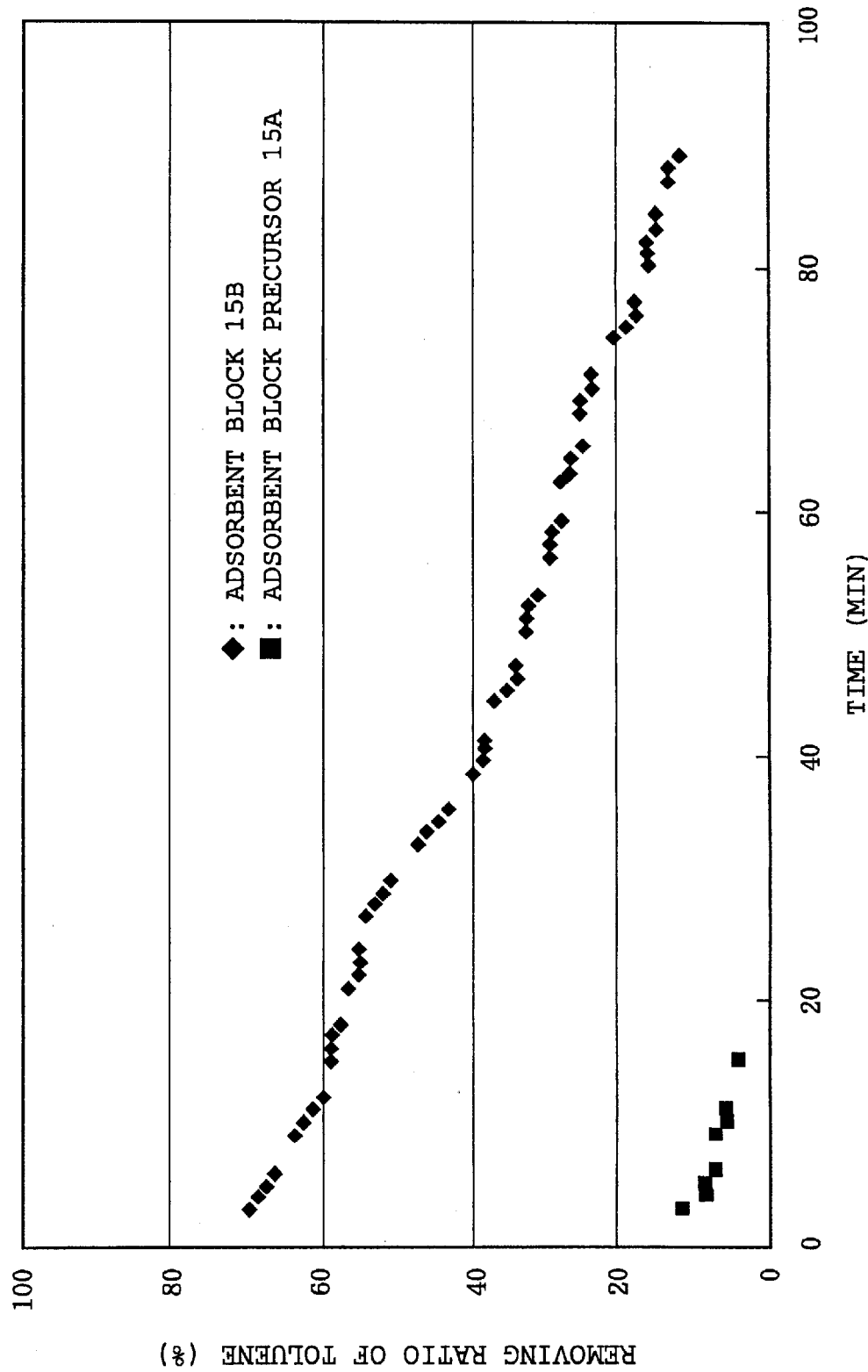
FIG. 14 is a graph showing the relationship between the time and the removing ratio of toluene in the sample relating to Test 6.

The time (min) and the removing ratio of toluene per one passage (%) are measured as similar to Test 2 for the adsorbent block precursors 15a and the adsorbent blocks 15b of Sample Nos. 6-0 to 6-2. The results of the adsorbent block precursor 15a and the adsorbent block 15b of Sample No. 6-0 are shown in FIG. 12, the results of the adsorbent block precursor 15a and the adsorbent block 15b of Sample No. 6-1 are shown in FIG. 13, and the results of the adsorbent block precursor 15a and the adsorbent block 15b of Sample No. 6-2 are shown in FIG. 14. The time when the removing ratio is decreased to 40% is designated as a service life (minute). The results are shown in Table 9.

TABLE 9

| Sample No. | Adsorbent block recursor Service life (min) | Adsorbent block Service life (min) |
|---|---|---|
| 6-0 | 4 | 5 |
| 6-1 | 0 | 35 |
| 6-2 | 0 | 35 |

It is understood from FIGS. 12 to 14 and Table 9 that while there is substantially no difference in service life between the adsorbent block precursor 15a and the adsorbent block 15b of Sample No. 6-0 having no agar component added as the additive 9, the adsorbent blocks 15b having an extremely long service life are obtained by subjecting the adsorbent block precursor 15a to the heating step S22 in Sample Nos. 6-1 and 6-2 having the agar component added as the additive 9.

APPLICATION EXAMPLES

Application examples of the adsorbent block obtained by the production process of the invention will be described.

Application Example to Cleaning Filter

Figure 15:
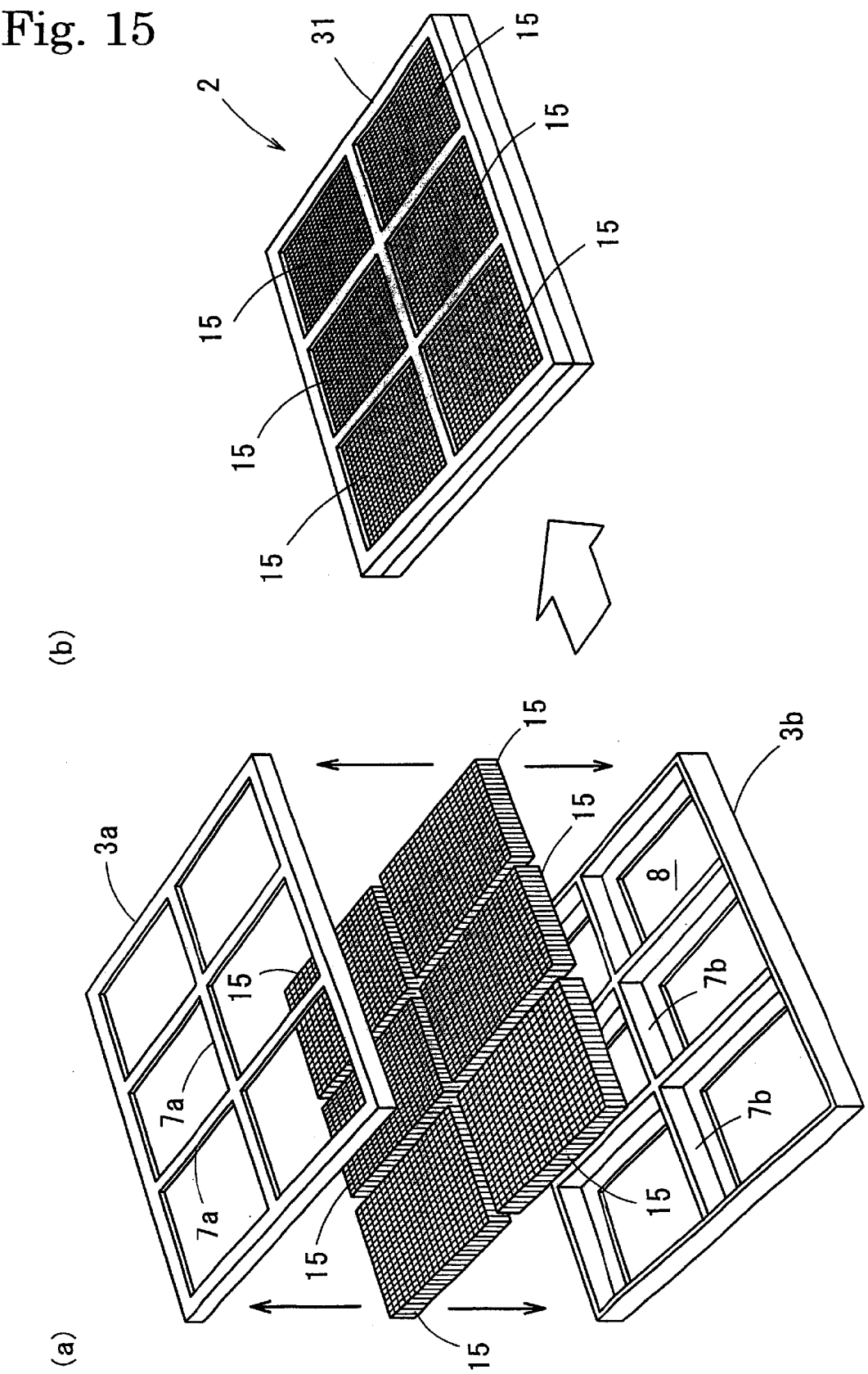
FIGS. 15A and 15B relate to an application example to a cleaning filter, in which 15A is a breakdown perspective view of the cleaning filter, and 15B is a perspective view of the cleaning filter.

The six pieces as one group of the adsorbent blocks of a honeycomb form 15 obtained in the foregoing process are retained by a cartridge 31 as shown in FIG. 15A, and are fabricated as a cleaning filter 2 as shown in FIG. 15B.

Figure 16:
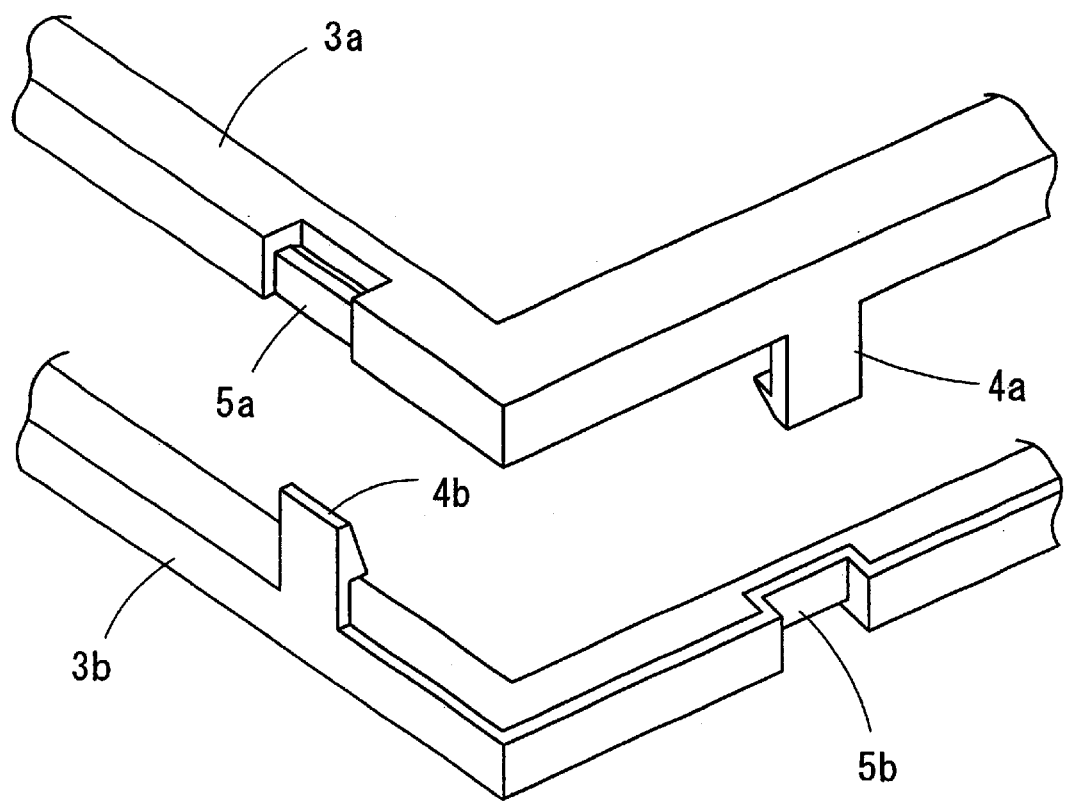
FIG. 16 relates to an application example to a cleaning filter and is a partial enlarged perspective view of a cartridge.

That is, the cartridge 31 is constituted with an upper member 3a and the lower member 3b, and on parts thereof facing each other, pluralities of teeth 4a and 4b and tooth acceptors 5a and 5b are provided as shown in FIG. 16. In the upper member 3a and the lower member 3b, partitions 7a and 7b of a grid form separating the respective adsorbent blocks 15 are provided. Edge parts for preventing drop-off of the adsorbent blocks 15 are formed on the partitions 7a and 7b. The respective adsorbent blocks 15 are mounted inside the receiving flames constituted by the partitions 7a and 7b, and the cleaning filter 2 is constituted by engaging the teeth 4a and 4b and the tooth acceptors 5a and 5b. Consequently, the plural adsorbent blocks 15 are retained by the cartridge 3, and the cleaning filter 2 is easily fabricated.

Figure 17:
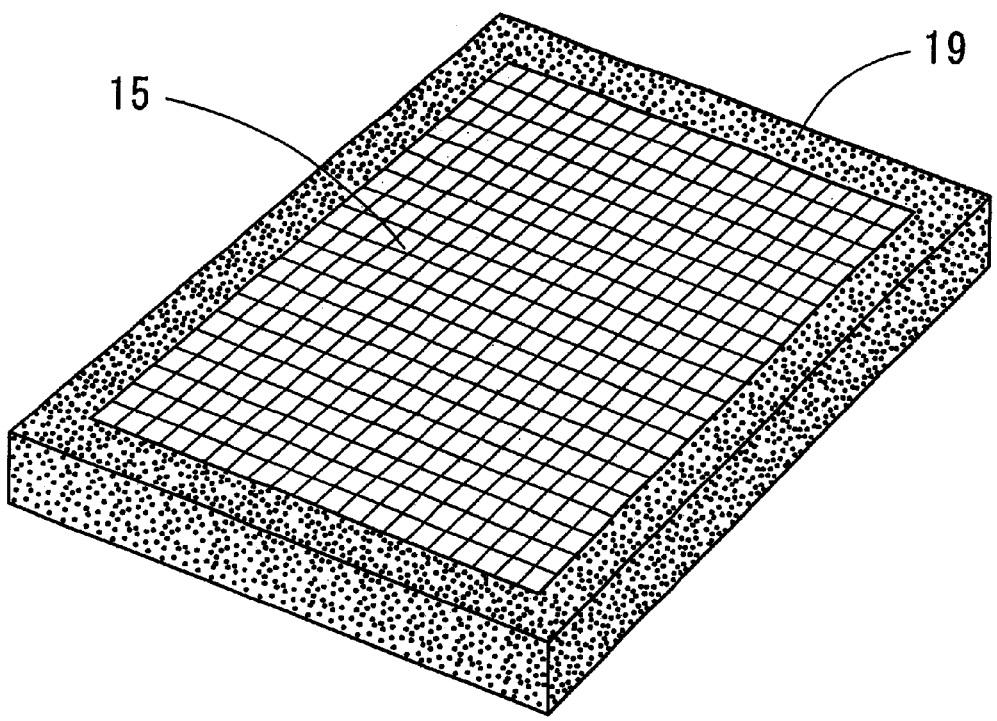
FIG. 17 relates to an application example to a cleaning filter and is a perspective view of the adsorbent block.

At this time, in order to ensure the airtightness between the adsorbent block 15 and the cartridge 31, it is also preferred that a seal member 19 is provided on the outer periphery of the adsorbent block 15 as shown in FIG. 17. As the seal member 19, foamed polyurethane may be employed. The seal member 19 may be provided on the inner periphery of the receiving flame of the cartridge 31, and may be provided on both the outer periphery of the adsorbent block 15 and the inner periphery of the receiving flame of the cartridge 31.

Because the resulting cleaning filter 2 uses the plural small adsorbent blocks 15, the adsorbent blocks 15 are substantially not broken even when it is used under severe conditions where vibration, impacts and the like are present. In particular, such an effect is large in the case where a seal member 19 having elasticity is provided between the respective adsorbent blocks 15 and the cartridge 31.

Application Example 1 to Air Conditioner

Figure 18:
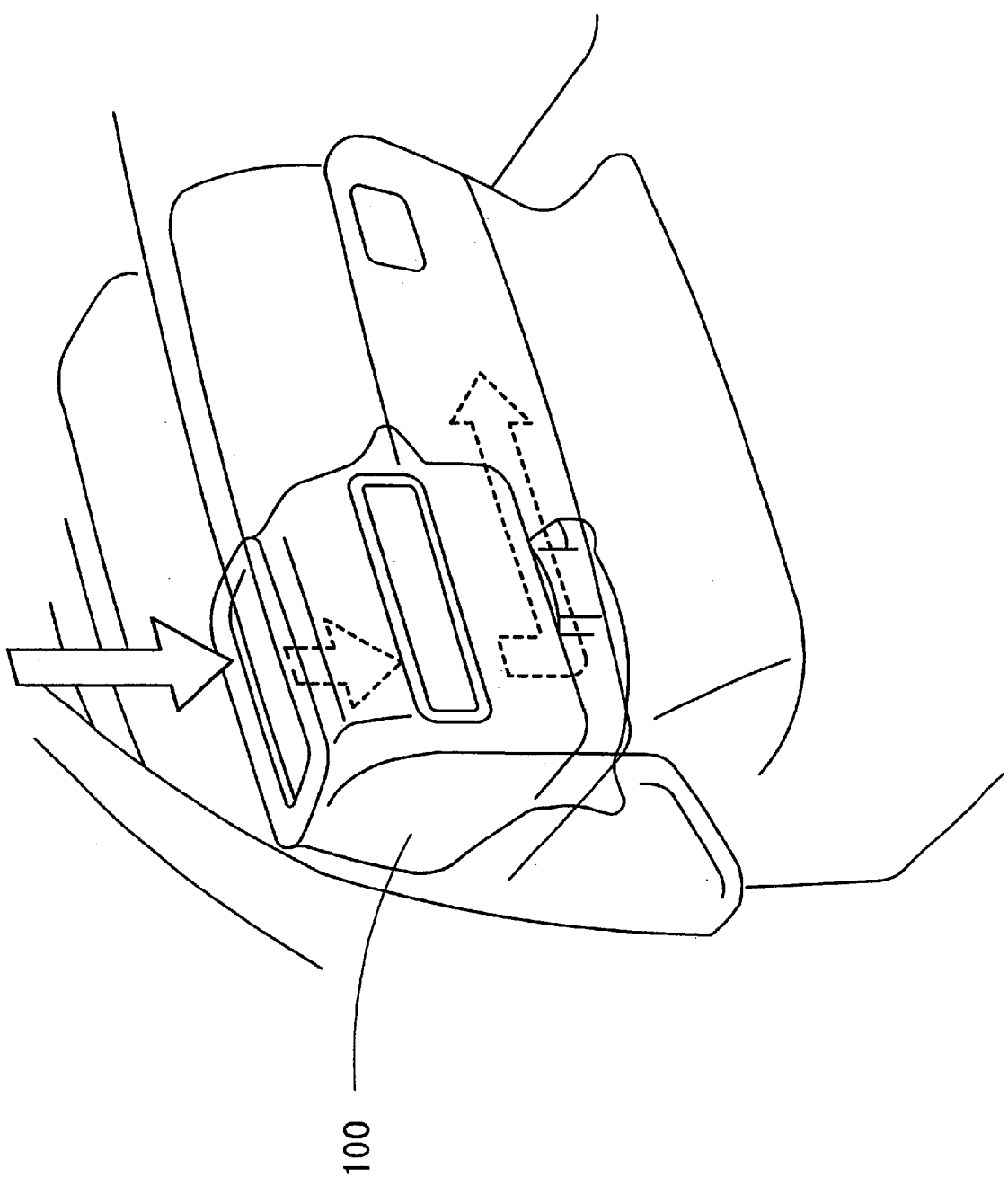
FIG. 18 relates to Application Example 1 to an air conditioner and is a perspective view of an air introduction unit of the air conditioner.
Figure 19:
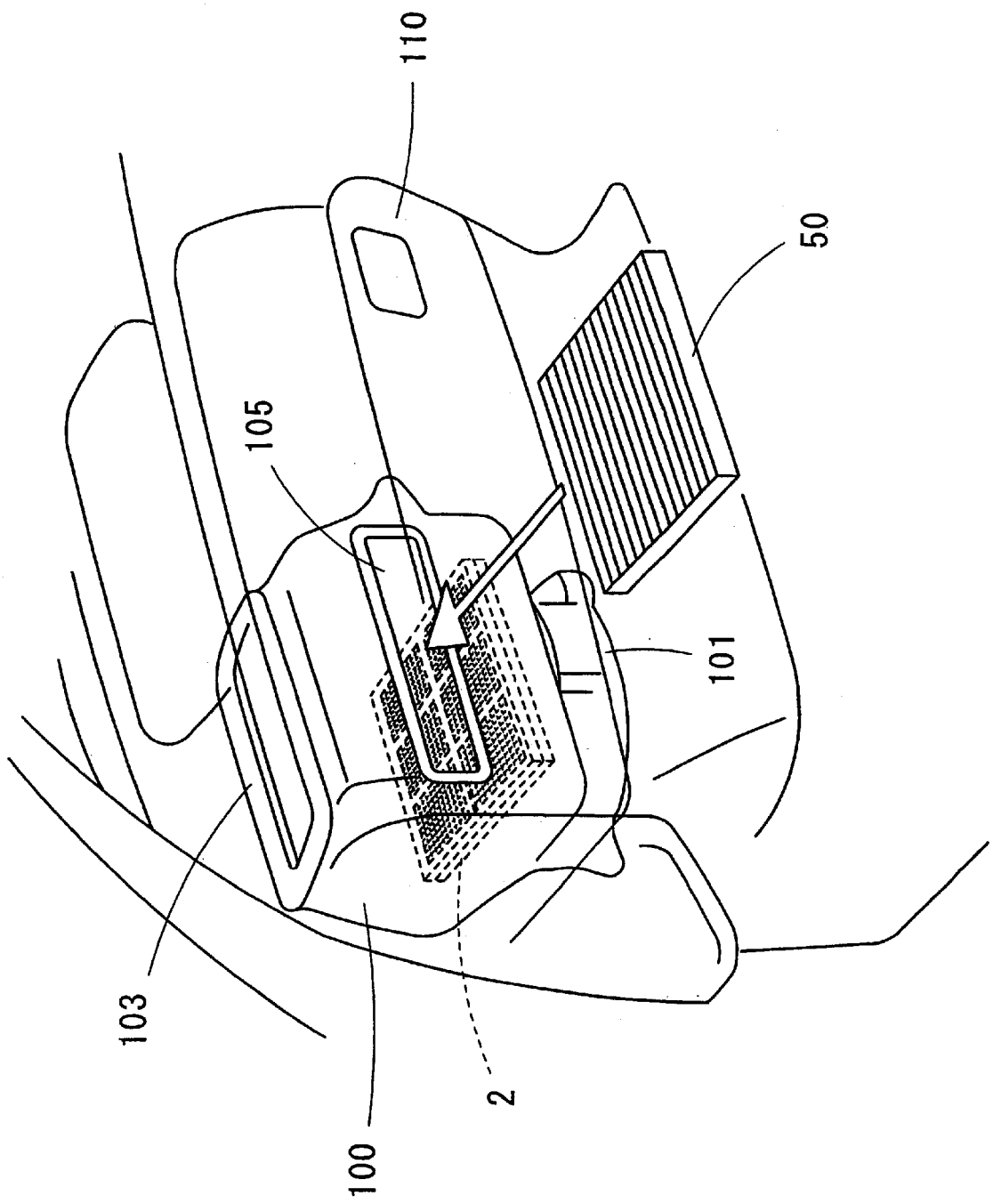
FIG. 19 relates to Application Example 1 to an air conditioner and is a perspective view of an air introduction unit of the air conditioner.

The cleaning filter 2 thus fabricated in the foregoing is installed in an air introduction unit 100 of the air conditioner as shown in FIGS. 18 and 19. In the air introduction unit 100, as shown in FIG. 19, a fan not shown in the figure is contained in a fan chamber 101, and an outside/inside air switching damper not shown in the figure is provided at an air introduction inlet 103.

An opening 105 for installing and uninstalling a dust collecting filter 50 is provided in the air introduction unit 100. The opening 105 is opened inside a glove box 110 and is closed with a lid not shown in the figure upon not using the air conditioner. The dust collecting filter 50 comprises nonwoven fabric formed into a wave form and a flame supporting the periphery of the nonwoven fabric. The outer circumferential dimension of the flame is the same as the outer circumferential dimension of a cartridge 31, both of which are designed to be airtightly connected with the inner wall of the air introduction unit 100.

Application Example 2 to Air Conditioner

Figure 20:
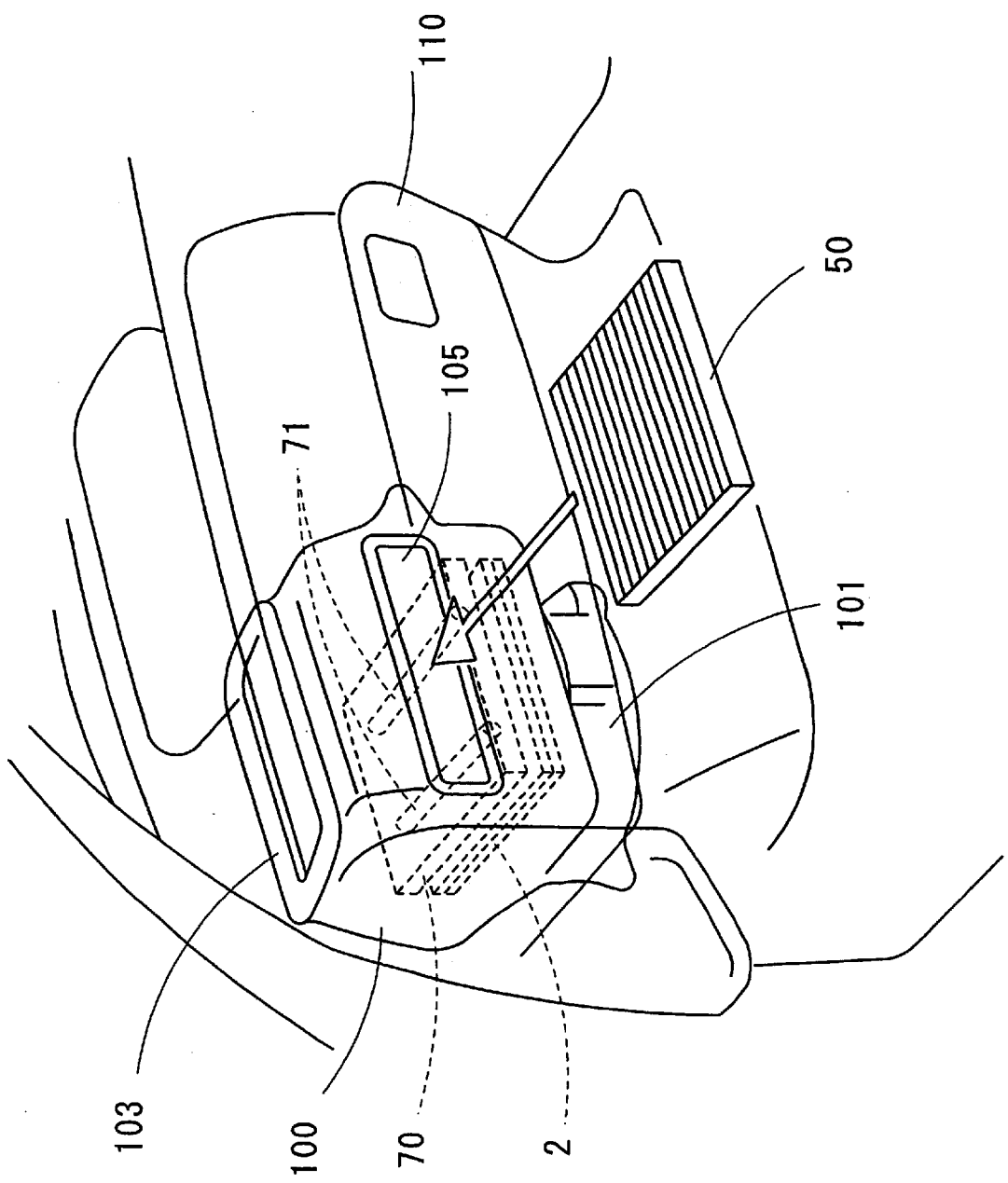
FIG. 20 relates to Application Example 2 to an air conditioner and is a perspective view of an air introduction unit of the air conditioner.

A cleaning filter 2, which uses the adsorbent block 15 having titanium oxide as a photocatalyst carried thereon produced in the same manner as the foregoing, is installed in an air introduction unit 100 shown in FIG. 20. The same symbols are attached to the same members as in Application Example 1 to omit the descriptions thereof.

In the air introduction unit 100, a light source unit 70 is provided between the cleaning filter 2 and a dust collecting filter 50. The light source unit 70 has two cold cathode tubes 71, and the respective cold cathode tubes 71 are supported by a flame having the same outer circumferential dimension as the cleaning filter 2. Titanium oxide is activated by an ultraviolet ray emitted from the cold cathode tubes 71, and gas components, such as an odor component, a nitrogen oxide and the like, adsorbed on the adsorbent block 15 are oxidized and decomposed. According thereto, the gas components are substantially removed from the adsorbent block 15 to regenerate the adsorbent block 15. Therefore, even when the cleaning filter 2 and the light source unit 70 are fixed on the air introduction unit 100, the adsorbent block 15 is substantially maintenance free, and there is no necessity of detaching the cleaning filter 2 from the air introduction unit 100. Accordingly, only the dust collecting filter 50 is detachably inserted in the air introduction unit 100.

Application Example 3 to Air Conditioner

Figure 21:
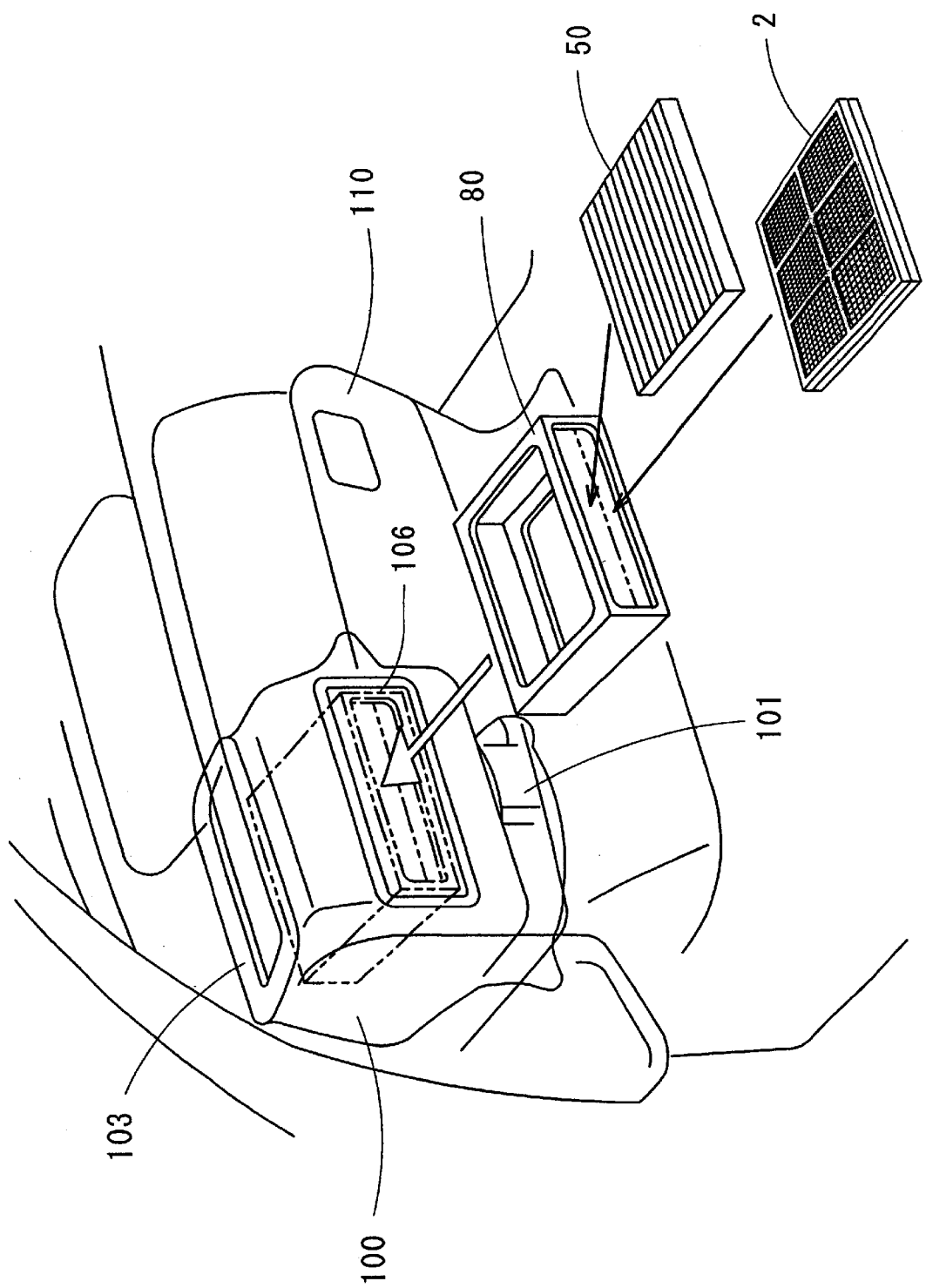
FIG. 21 relates to Application Example 3 to an air conditioner and is a perspective view of an air introduction unit of the air conditioner.

A cleaning filter 2, which is the same as Application Example 2, is installed in an air introduction unit 100 shown in FIG. 21. The same symbols are attached to the same members as in Application Examples 1 and 2 to omit the descriptions thereof.

In the air introduction unit 100, a dust collecting filter 50 and the cleaning filter 2 are detachably inserted in a holder 80. The holder 80 is detachably inserted in the air introduction unit 100 through an opening 106 having a large diameter in the glovebox 110. According thereto, installation and uninstallation of the dust collecting filter 50 and the cleaning filter 2 becomes easy.

The cleaning filter 2 taken out from the holder 80 is subjected to regeneration of the adsorbent block 15 by irradiation with an ultraviolet ray or allowing to stand under the sun.

Application Example 4 to Air Conditioner

Figure 22:
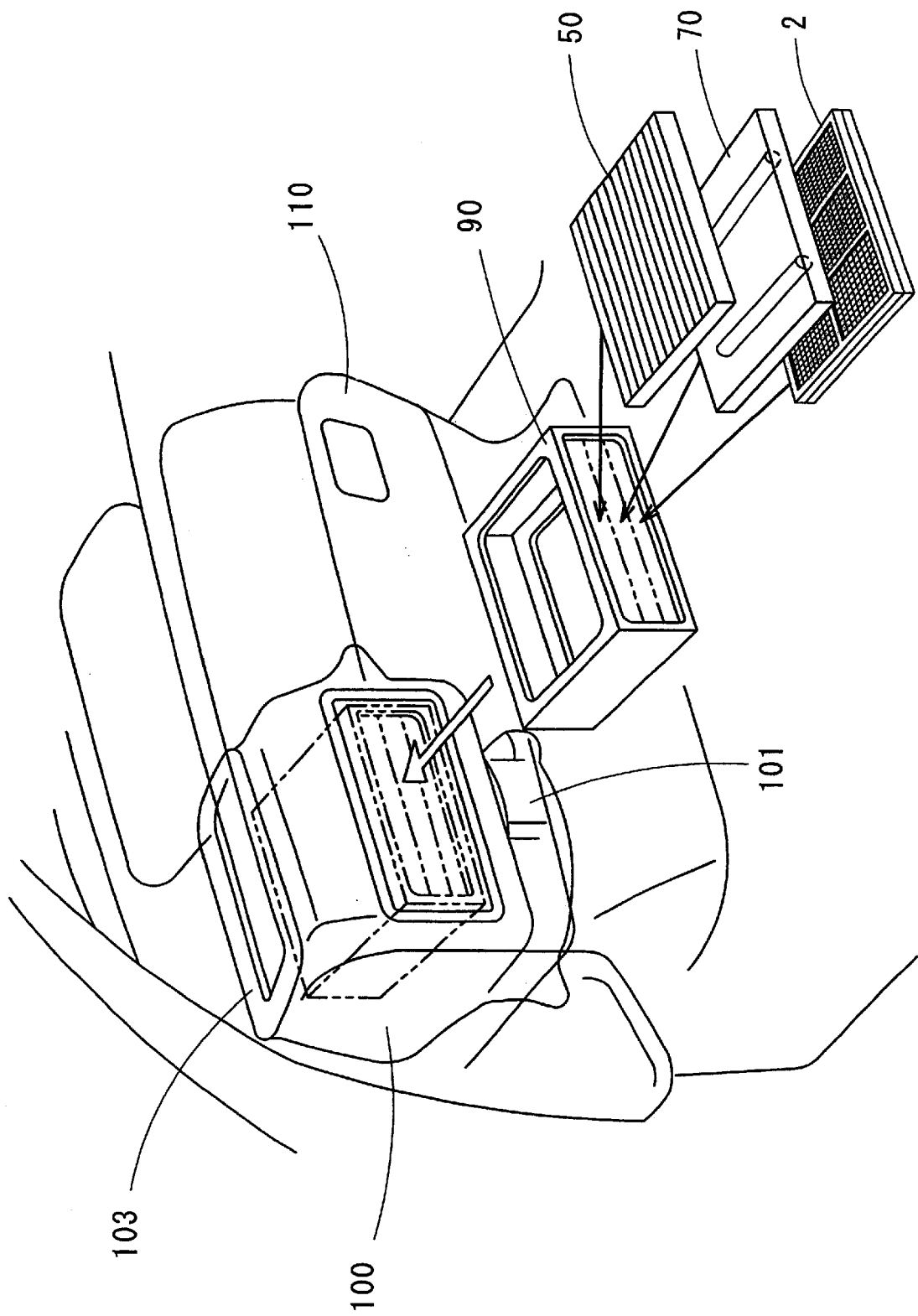
FIG. 22 relates to Application Example 4 to an air conditioner and is a perspective view of an air introduction unit of the air conditioner.

A cleaning filter 2, which is the same as Application Examples 2 and 3, is installed in an air introduction unit 100 shown in FIG. 22. The same symbols are attached to the same members as in Application Examples 1 to 3 to omit the descriptions thereof.

In the air introduction unit 100, a light source unit 70, as well as a dust collecting filter 50 and the cleaning filter 2, are detachably inserted in a holder 90.

The foregoing examples and application examples are only exemplification, and the invention can be practiced in embodiments having various changes made therein unless they deviates from the substance of the invention.

INDUSTRIAL APPLICABILITY

According to the production process of the invention, an adsorbent block that has a high adsorption efficiency and can be produced at a low cost can be obtained.

What is claimed is:

1. A process for producing an adsorbent block comprising a first step of preparing a dispersion system comprising a liquid dispersion medium mainly having porous material powder as a solid disperse phase, and forming a molded block from said dispersion system, and a second step of removing said liquid dispersion medium from said molded block to bind mainly said porous material powder, so as to obtain an adsorbent block formed to have continuous flow paths, characterized in that said dispersion system contains a binder that is capable of binding said porous material powder and an area increasing agent that disappears by heating said molded block at a particular temperature, at which said binder does not disappear, and said second step comprises a liquid dispersion medium removing step of removing said liquid dispersion medium, and a heating step of heating said molded block at said particular temperature.

2. A process for producing an adsorbent block as described in claim 1, characterized in that said area increasing agent is an agar component, and said liquid dispersion medium is water.

3. A process for producing an adsorbent block as described in claim 1, characterized in that said porous material powder is active carbon powder.

4. A process for producing an adsorbent block as described in claim 3, characterized in that said adsorbent block has continuous flow paths extending in a straight form.

5. A process for producing an adsorbent block as described in claim 4, characterized in that said adsorbent block is in a honeycomb form.

* * * * *